US009832087B2

(12) United States Patent
Pearce et al.

(10) Patent No.: US 9,832,087 B2
(45) Date of Patent: Nov. 28, 2017

(54) ENTERPRISE INTEGRATION WITH CLOUD-BASED MULTIMEDIA SYSTEM

(71) Applicant: Cisco Technology, Inc., San Jose, CA (US)

(72) Inventors: Christopher Pearce, Dallas, TX (US); Jonathan D. Rosenberg, Freehold, NJ (US); Scott A. Henning, Fairview, TX (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 14/155,971

(22) Filed: Jan. 15, 2014

(65) Prior Publication Data

US 2015/0200974 A1    Jul. 16, 2015

(51) Int. Cl.
| | |
|---|---|
| *G06F 15/16* | (2006.01) |
| *H04L 12/26* | (2006.01) |
| *H04L 29/06* | (2006.01) |
| *H04L 29/08* | (2006.01) |
| *G06F 9/50* | (2006.01) |

(52) U.S. Cl.
CPC .......... *H04L 43/08* (2013.01); *H04L 65/1069* (2013.01); *G06F 9/5072* (2013.01); *H04L 65/1096* (2013.01); *H04L 65/4007* (2013.01); *H04L 67/24* (2013.01); *H04L 67/26* (2013.01)

(58) Field of Classification Search
CPC .................................................. H04L 63/0272
USPC ....................................................... 709/203
See application file for complete search history.

(56) References Cited

U.S. PATENT DOCUMENTS

| | | | |
|---|---|---|---|
| 7,010,108 | B2 | 3/2006 | DelHoyo et al. |
| 7,679,638 | B2 | 3/2010 | Eshkoli et al. |
| 7,983,660 | B2 | 7/2011 | Bao et al. |
| 8,229,096 | B1* | 7/2012 | Marquis ............... H04M 3/562 |
| | | | 348/14.09 |
| 8,265,614 | B2 | 9/2012 | Allen et al. |
| 8,589,563 | B2 | 11/2013 | Ethier et al. |
| 2003/0023730 | A1 | 1/2003 | Wengrovitz et al. |
| 2006/0239275 | A1 | 10/2006 | Zlateff et al. |
| 2008/0320082 | A1* | 12/2008 | Kuhlke ............... H04L 12/1822 |
| | | | 709/205 |

(Continued)

*Primary Examiner* — Glenford Madamba
(74) *Attorney, Agent, or Firm* — Edell, Shapiro & Finnan, LLC

(57) ABSTRACT

Techniques are described herein for facilitating a connection between a cloud networking platform and a unified communication system, where the cloud networking platform hosts communication services including real-time communications for client devices, and the unified communication system hosts communication services including real-time communications for on-prem devices that are associated with the unified communication system. Events associated with the cloud networking platform are monitored at the unified communication system, via a cloud connector device of the unified communication system, where events are associated with users who are registered with client devices and on-prem devices, and the events include real-time communications. A notification is provided to one or more client devices registered to a first user in response to an on-prem device also registered to the first user receiving a real-time communication request from a device of another user.

6 Claims, 39 Drawing Sheets

(56) References Cited

U.S. PATENT DOCUMENTS

| | | | |
|---|---|---|---|
| 2009/0191915 A1* | 7/2009 | Abramson | H04W 8/02 |
| | | | 455/558 |
| 2012/0260189 A1 | 10/2012 | Howard et al. | |
| 2013/0039360 A1* | 2/2013 | Manian | H04L 12/589 |
| | | | 370/352 |
| 2013/0196637 A1 | 8/2013 | Allen et al. | |
| 2014/0108665 A1* | 4/2014 | Arora | H04L 67/141 |
| | | | 709/227 |

\* cited by examiner

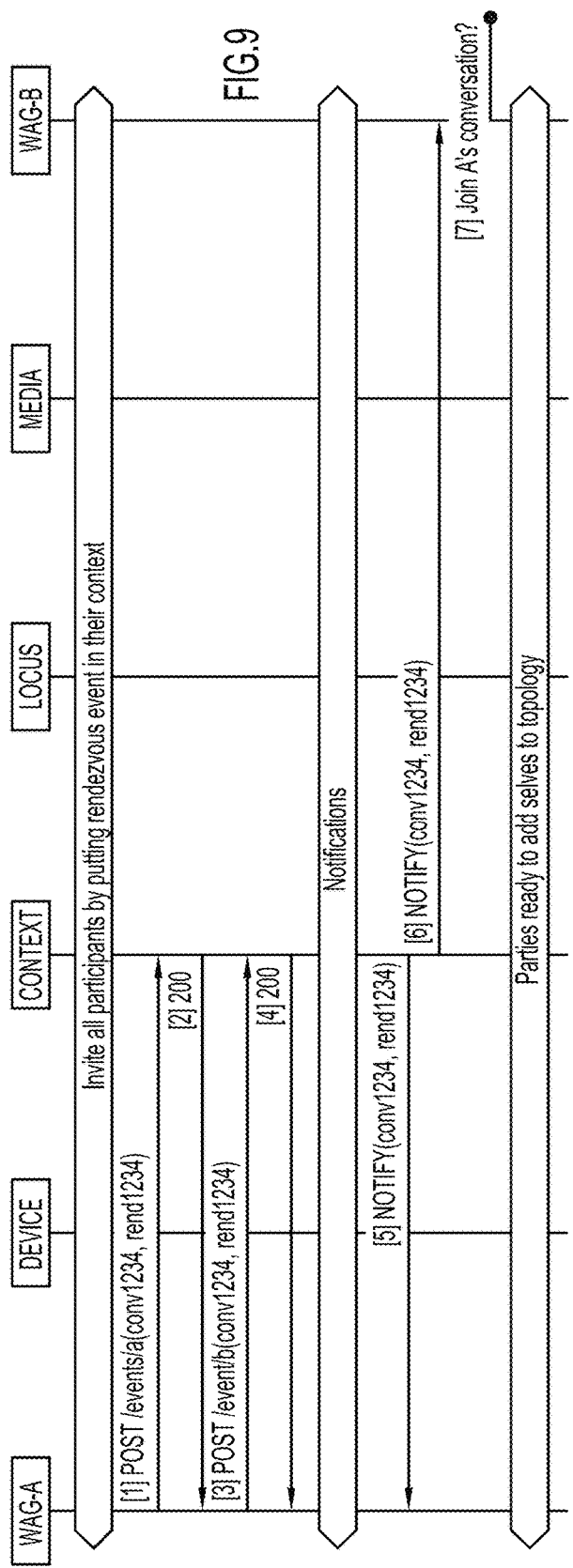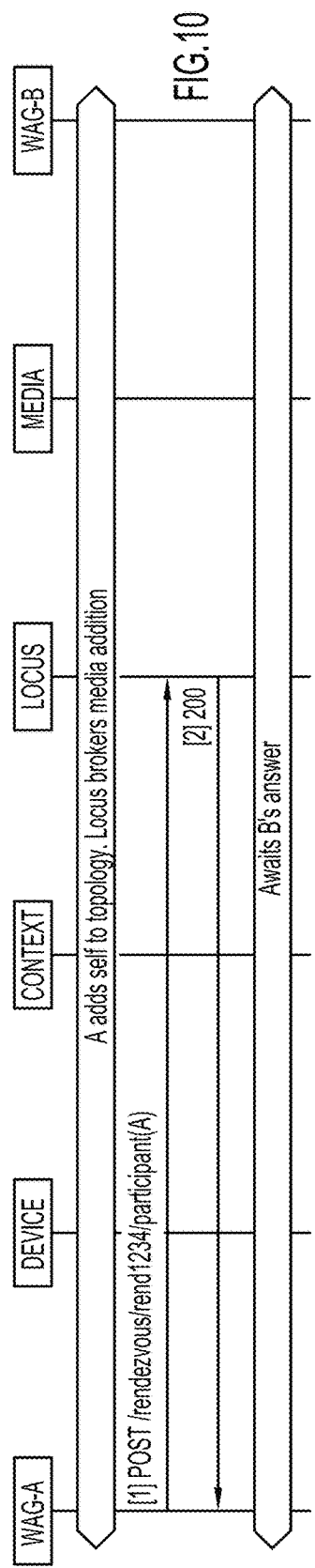

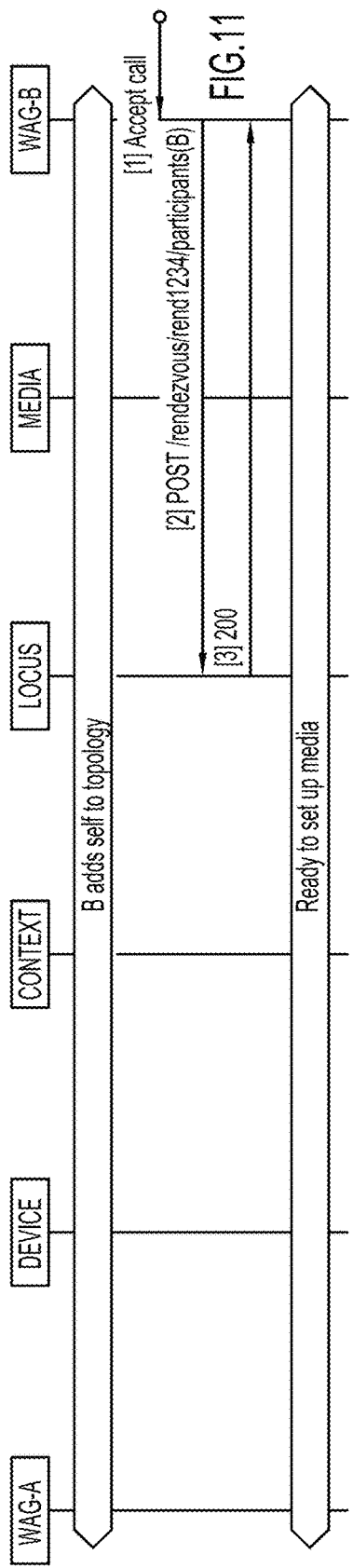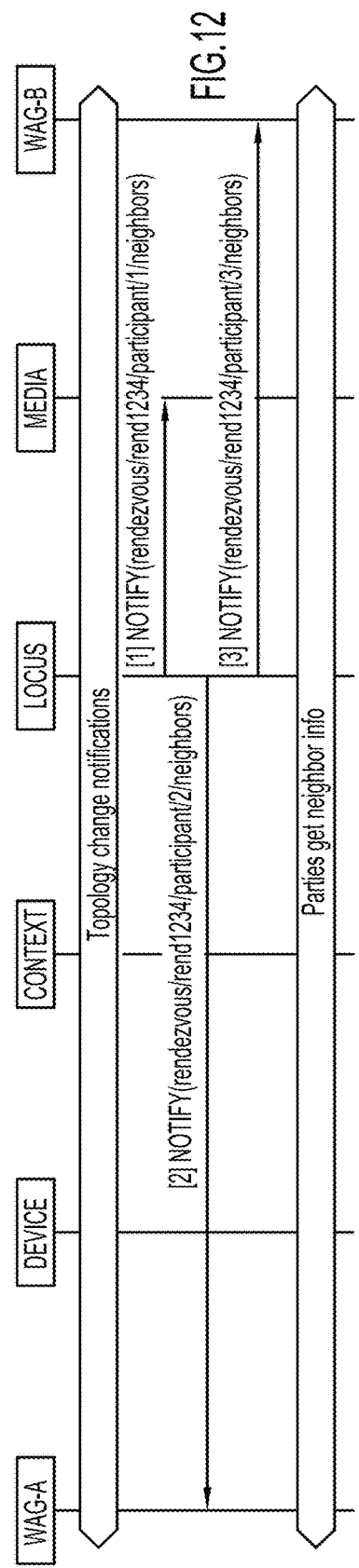

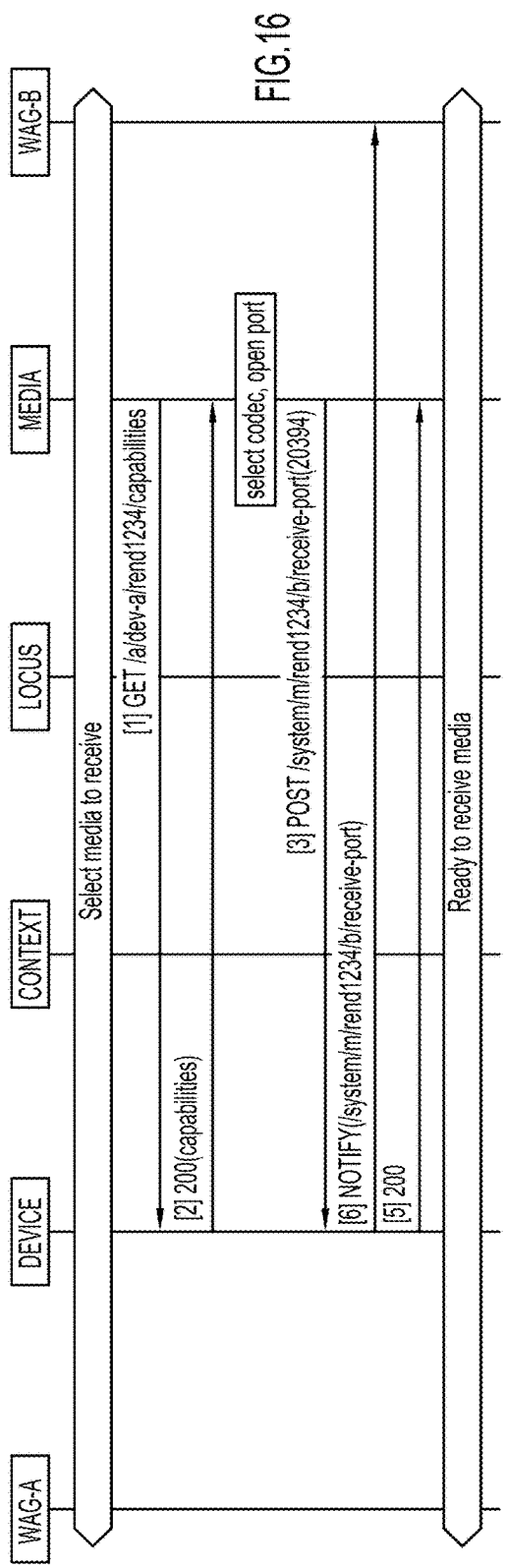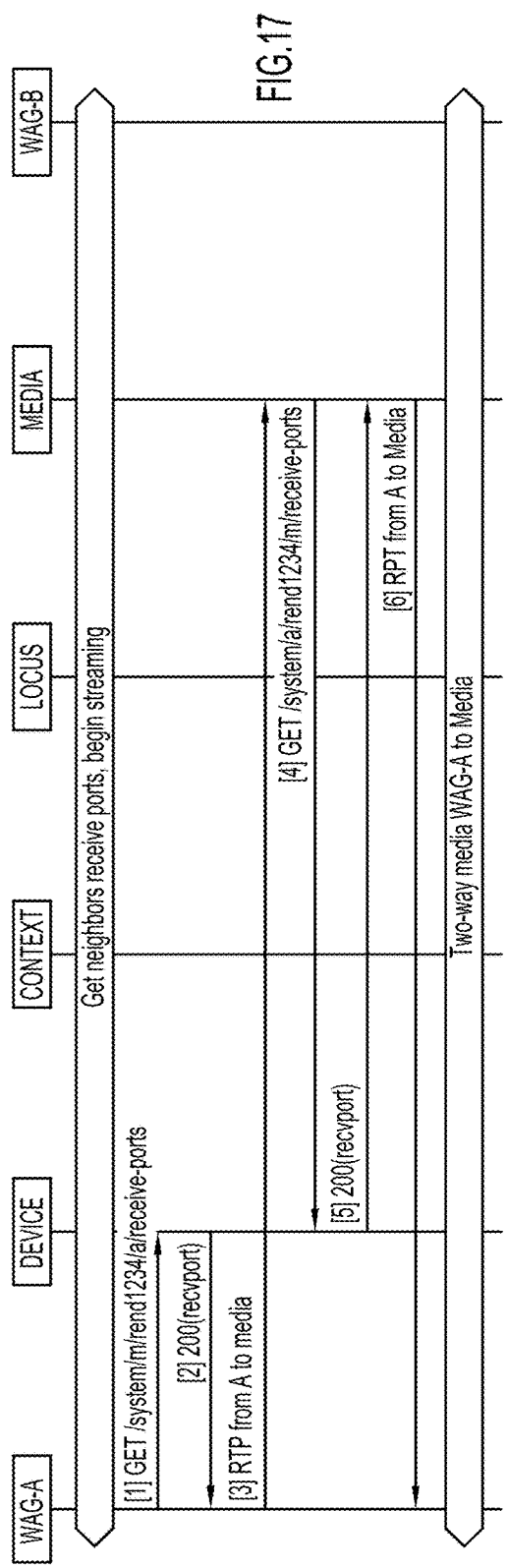

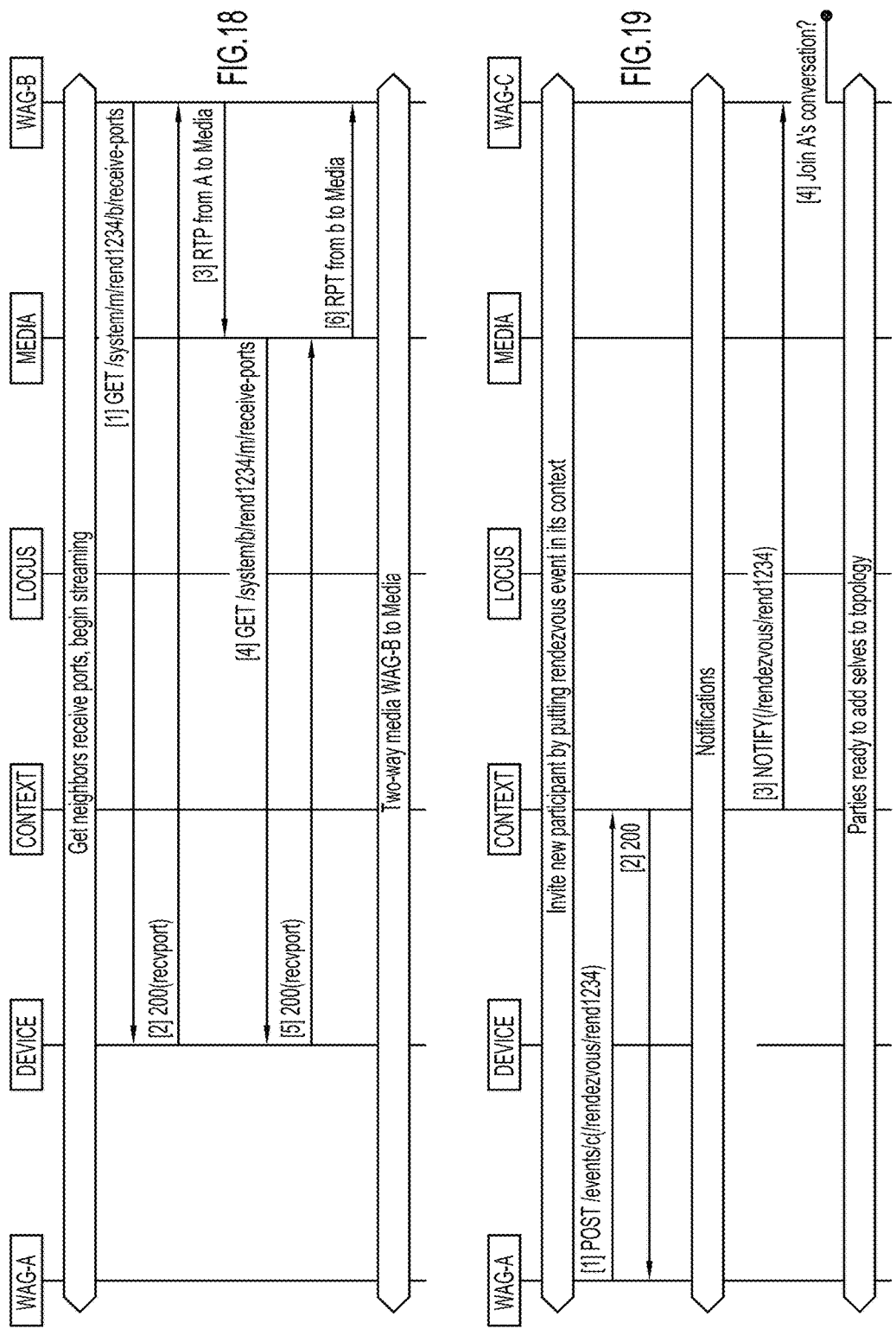

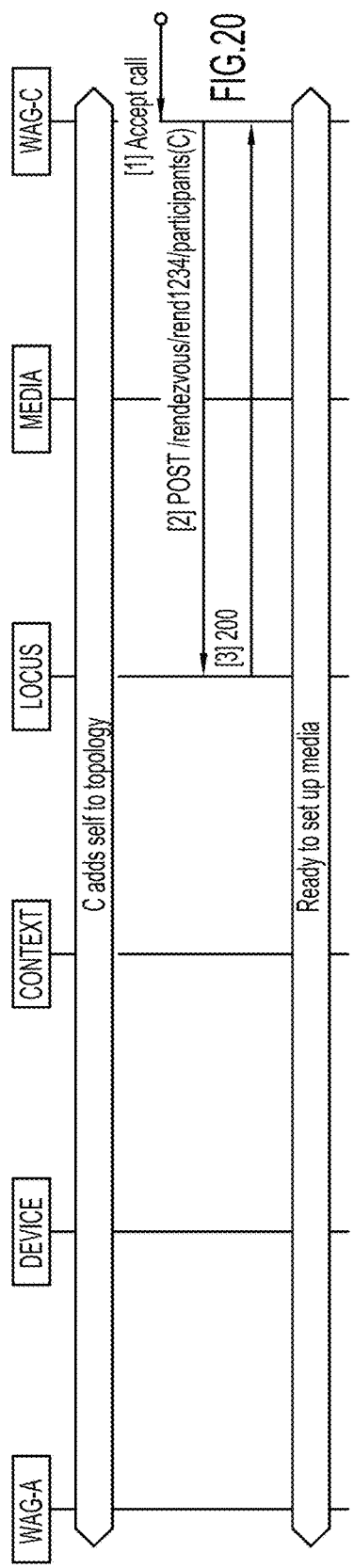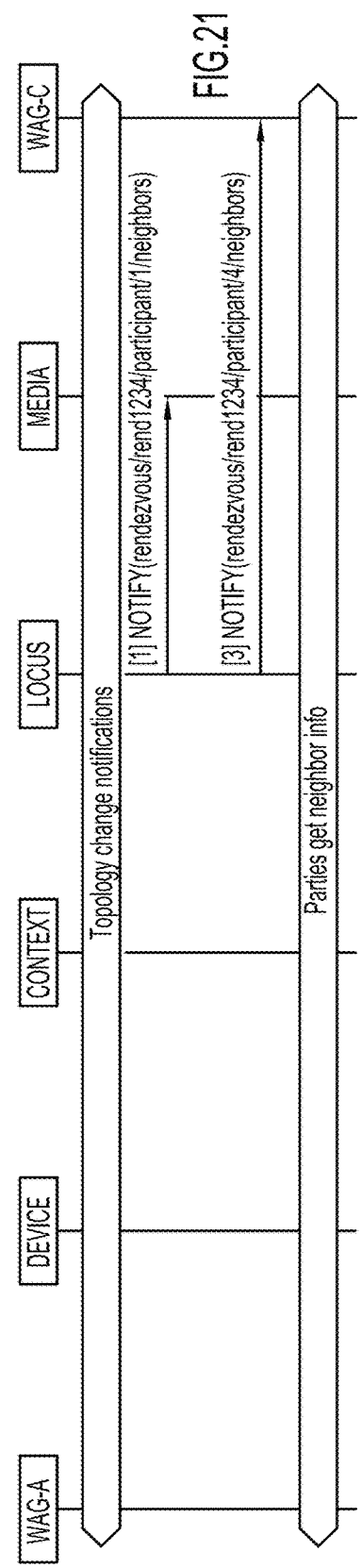

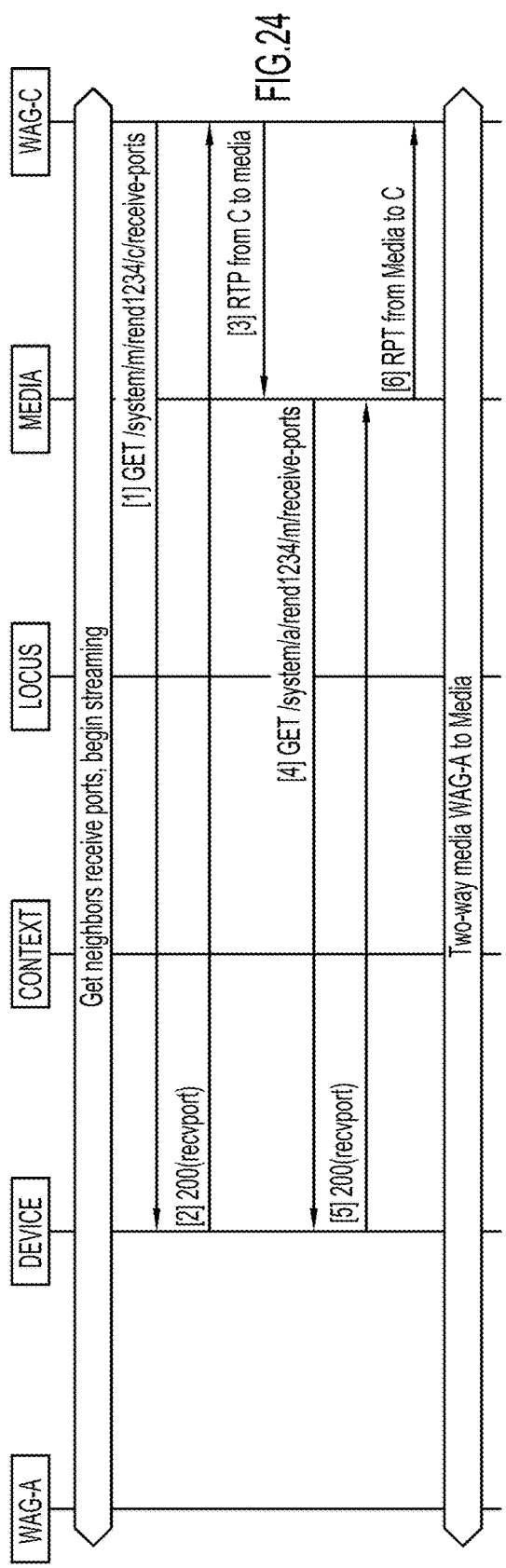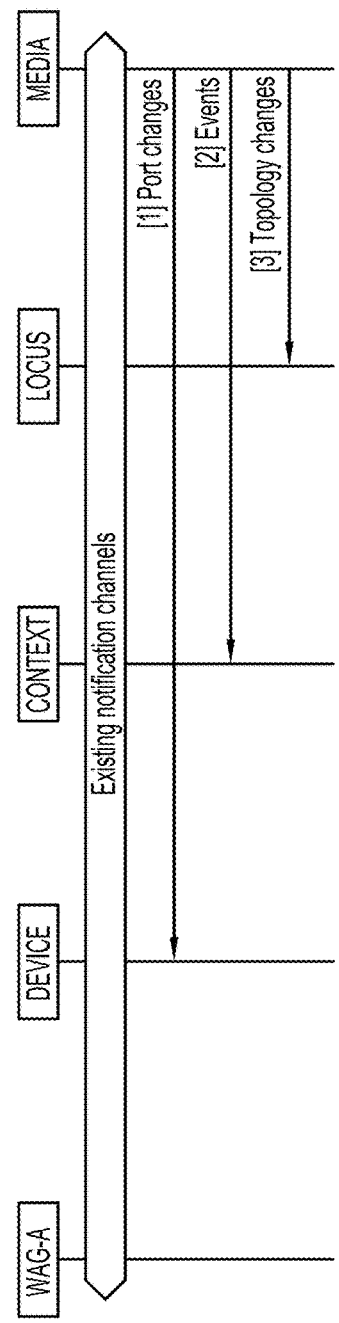

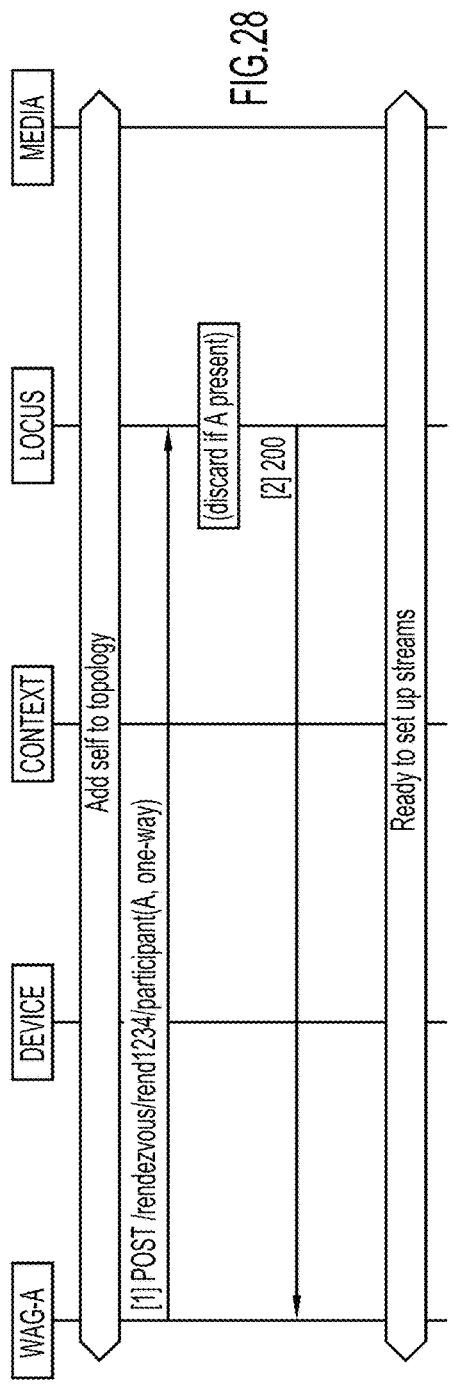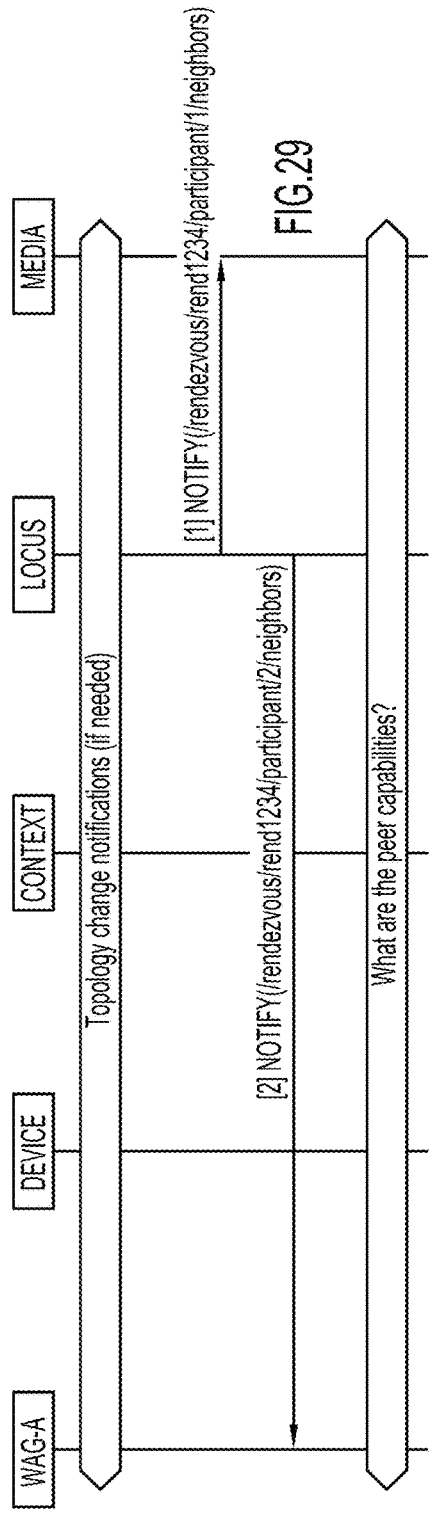

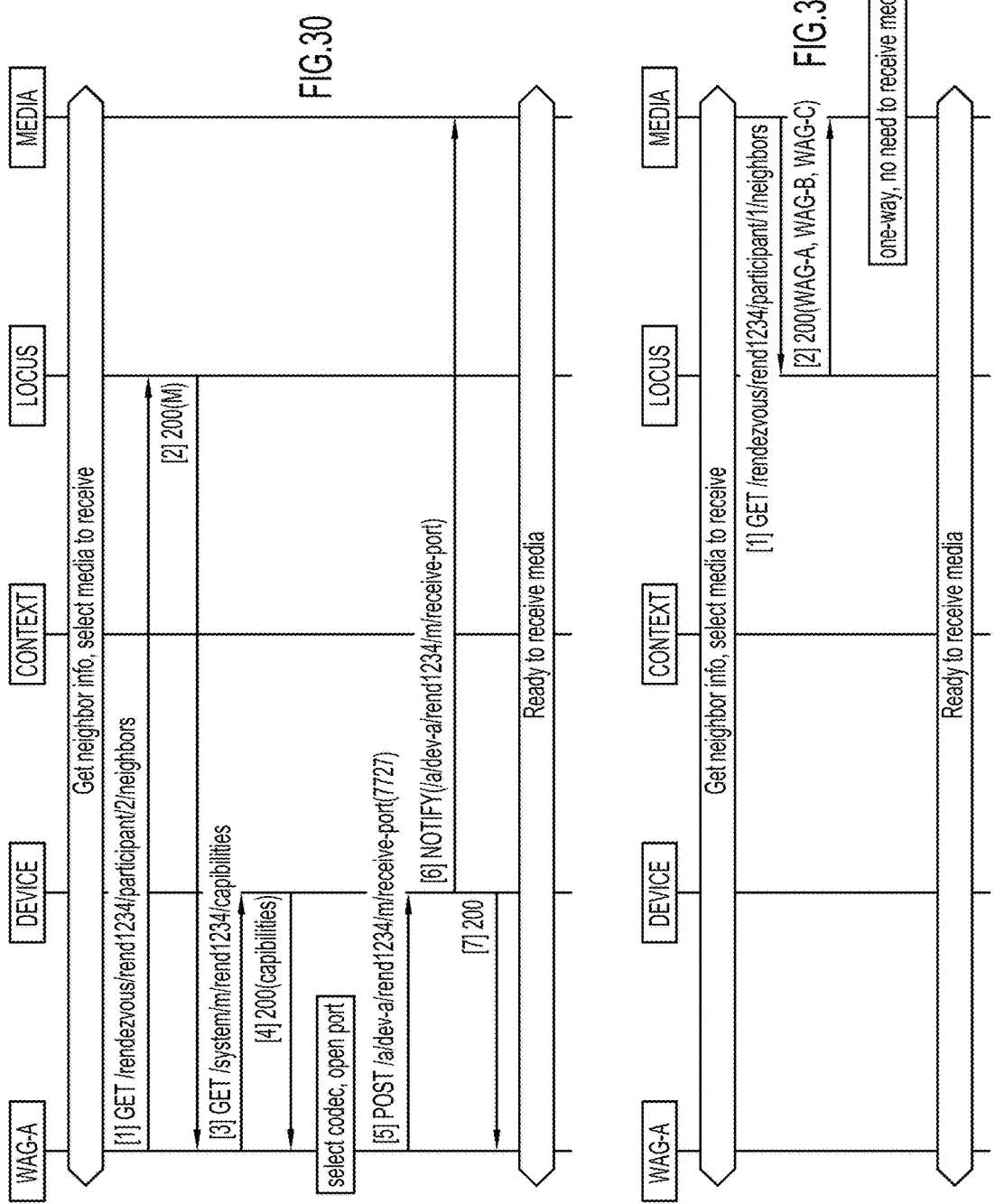

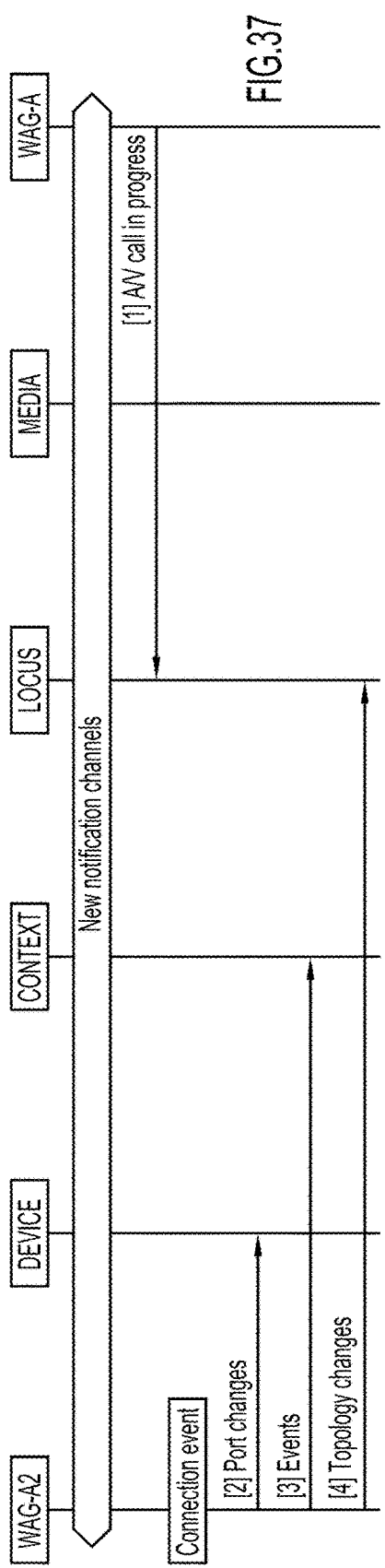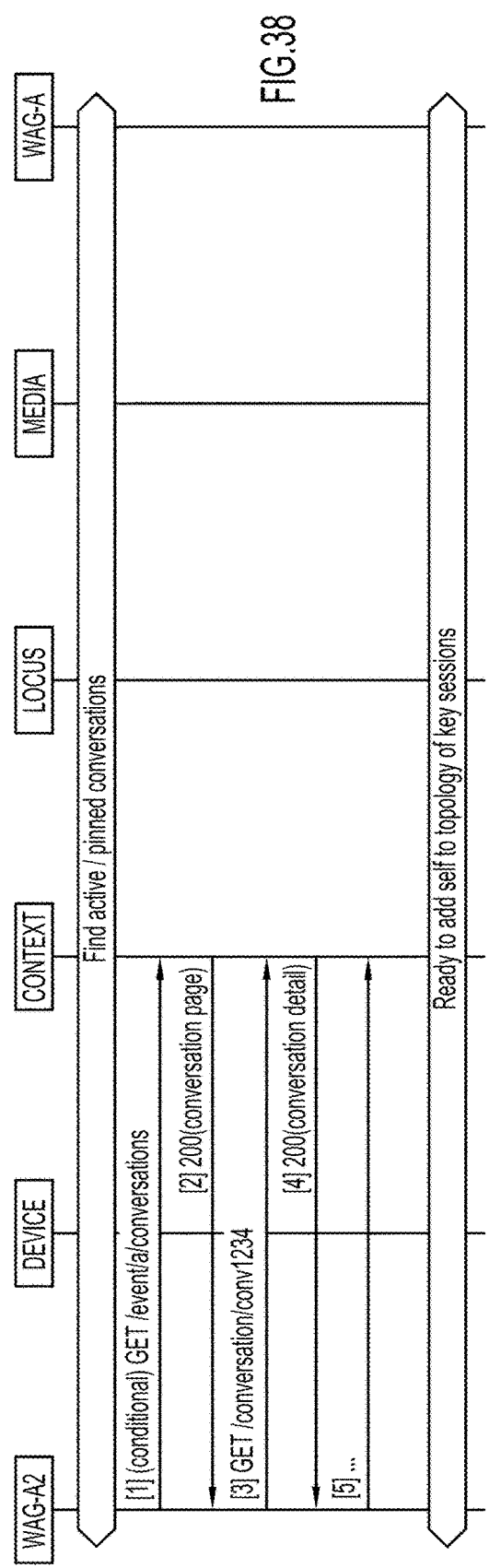

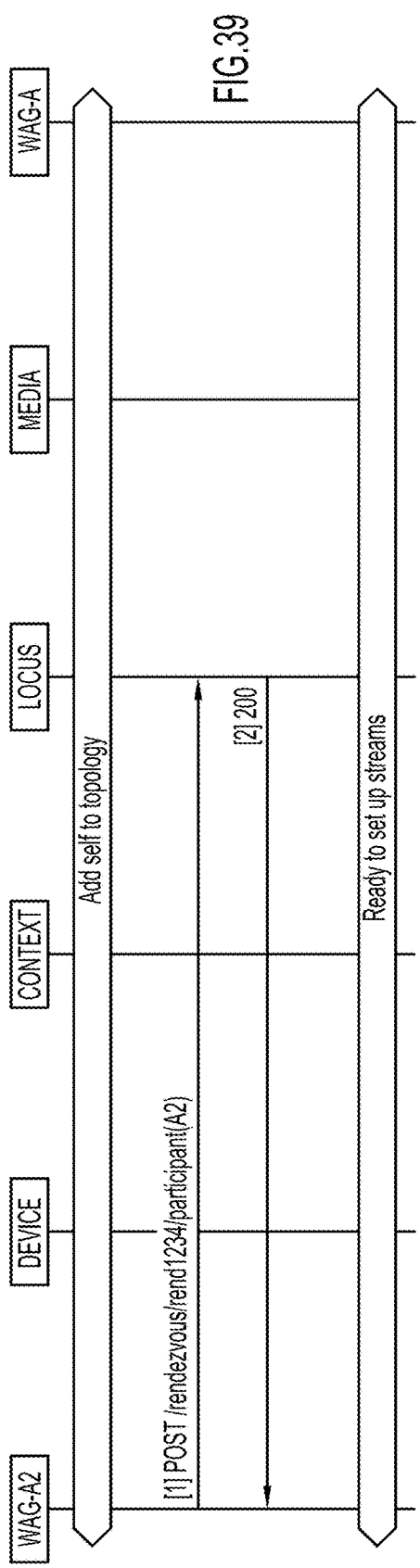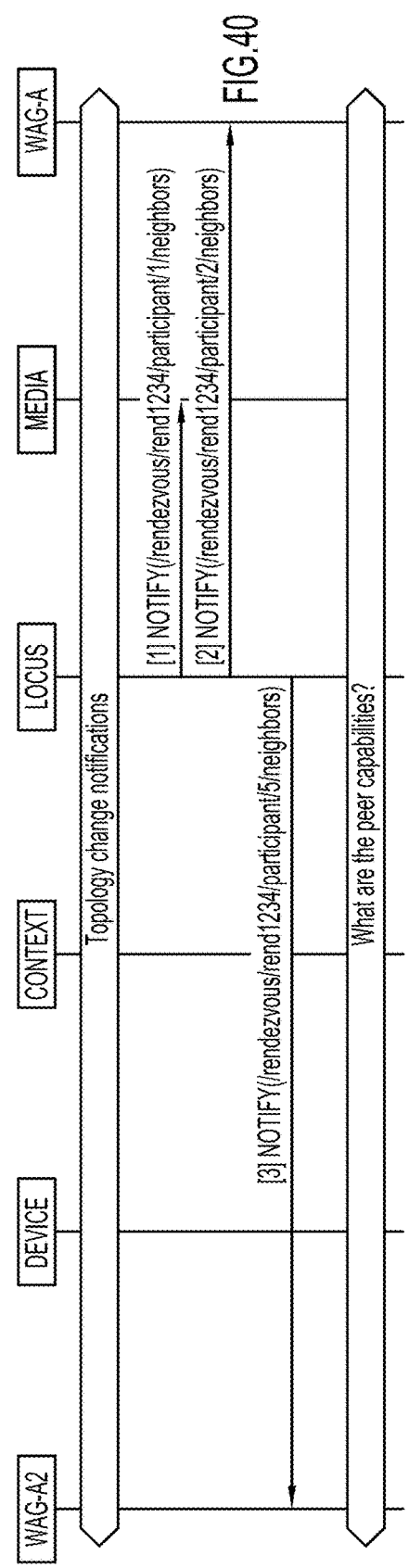

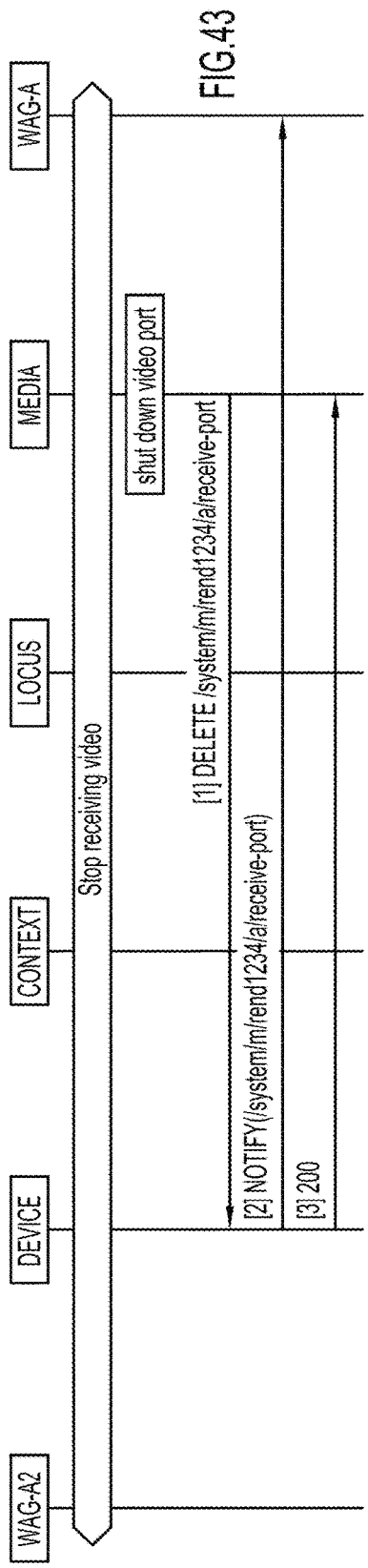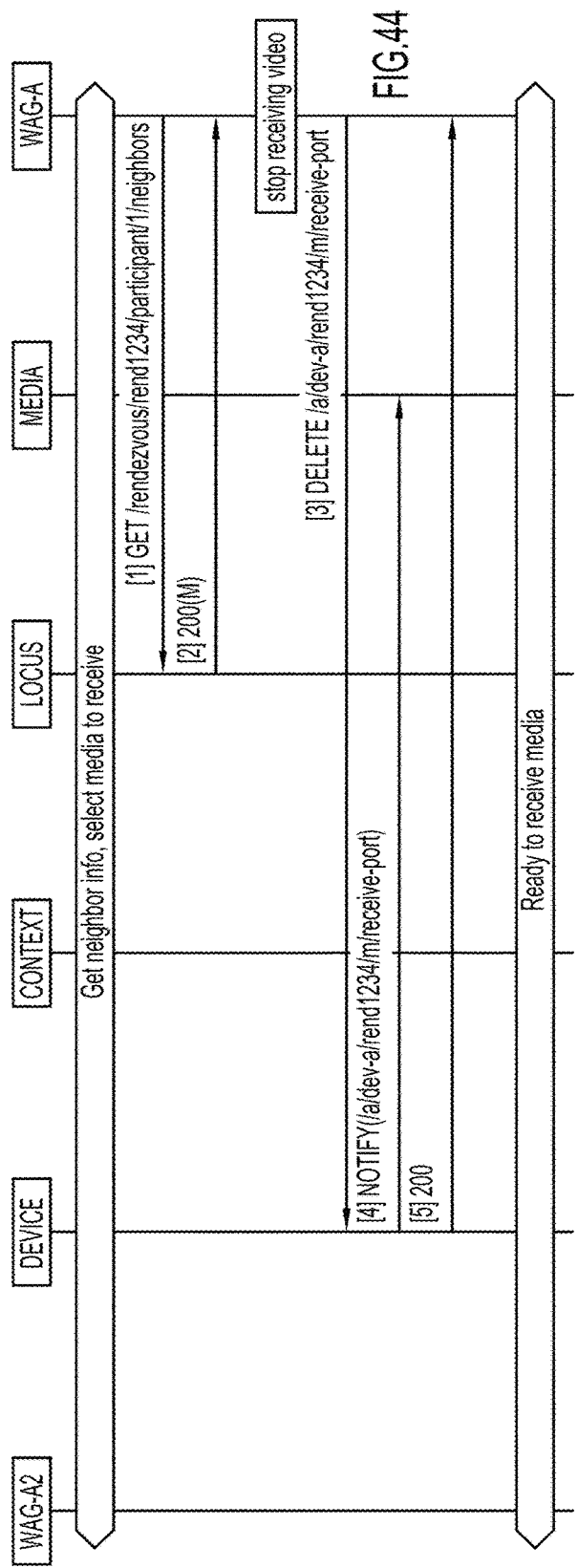

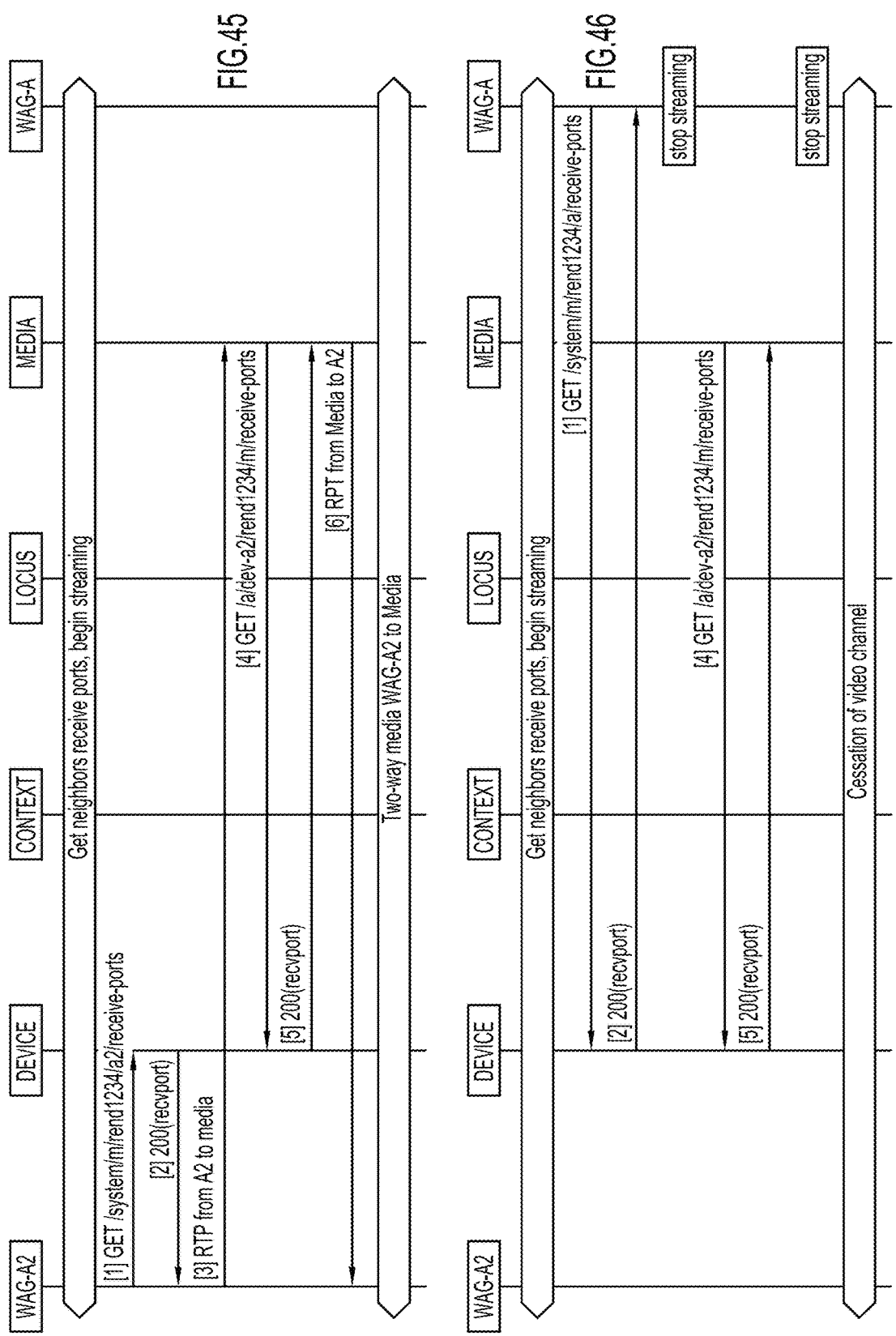

ENTERPRISE INTEGRATION WITH CLOUD-BASED MULTIMEDIA SYSTEM

TECHNICAL FIELD

The present disclosure relates to hosting real-time communications between clients within an enterprise system and over a cloud based multimedia system.

BACKGROUND

In telecommunications systems, a call agent serves as a media gateway controller to handle specific services to client endpoints (e.g., stationary or desktop phones or mobile devices, such as mobile phones, laptops, etc.). A call agent controls signaling communications between client endpoints, including connecting one client endpoint to another based upon user entry of a destination (e.g., phone) number associated with the other client endpoint that is used by the call agent to connect the client endpoints so as to facilitate communication of content (e.g., audio and/or video content) between the client endpoints. The call agent further terminates the connection after the communication has ended (e.g., based upon one or both client endpoints signaling an end for the communication in a conventional or other suitable manner).

Operation of telecommunications with typical call agents, while useful for stationary (e.g., on-prem) endpoint devices, may experience some issues with certain mobile endpoint devices. For example, traditional approaches that provide long term signal connections with mobile endpoint devices (e.g., to provide a call agent with information about the availability of a mobile endpoint device) can lead to a shortened time period in which the mobile endpoint device can be used between battery charging. In addition, mobile operating systems are prone to shutting down of applications being run on mobile client devices in scenarios in which such applications are not currently being used (i.e., not in the foreground). Mobile endpoint devices can also experience connectivity issues (e.g., a mobile phone call connection may be lost when moving to areas in which the signal degrades or is lost) that result in a dropped communication, which can complicate the ability for the mobile endpoint device to re-connect with an ongoing or real-time communication session (e.g., a communication session that involves three or more parties). In addition, it can be difficult for a user to transition between a cloud based, mobile endpoint device and an on-prem endpoint device based upon conventional telecommunication systems.

BRIEF DESCRIPTION OF THE DRAWINGS

FIGS. 7-18 are communication flow diagrams depicting an example embodiment of communication/message flows between client devices and components of the locus-based cloud service system of FIG. 2 in relation to establishing a real-time communication between the client devices.

FIGS. 19-24 are communication flow diagrams depicting an example embodiment of communication/message flows between client devices and components of the locus-based cloud service system of FIG. 2 in relation to a client device being added to a currently ongoing real-time communication.

FIGS. 25-32 are communication/signal flow diagrams depicting an example embodiment of signal flows between a client device and components of the locus-based cloud service system of FIG. 2 in relation to the client device disconnecting and then re-connecting with a currently ongoing real-time communication.

FIGS. 37-46 are communication/signal flow diagrams depicting an example embodiment of signal flows between a client device and components of the locus-based cloud service system of FIG. 2 in relation to a participant of the current or ongoing real-time communication switching a video stream of the communication from one client device to another client device.

DESCRIPTION OF EXAMPLE EMBODIMENTS

Overview

Techniques are presented herein for facilitating a connection between a cloud networking platform and a unified communication system, where the cloud networking platform hosts communication services including real-time communications for client devices, and the unified communication system hosts communication services including real-time communications for on-prem devices that are associated with the unified communication system. Events associated with the cloud networking platform are monitored at the unified communication system, via a cloud connector device of the unified communication system, where events are associated with users who are registered with client devices and on-prem devices, and the events include real-time communications. A notification is provided to one or more client devices registered to a first user in response to an on-prem device also registered to the first user receiving a real-time communication request from a device of another user.

Example Embodiments

Figure 1:
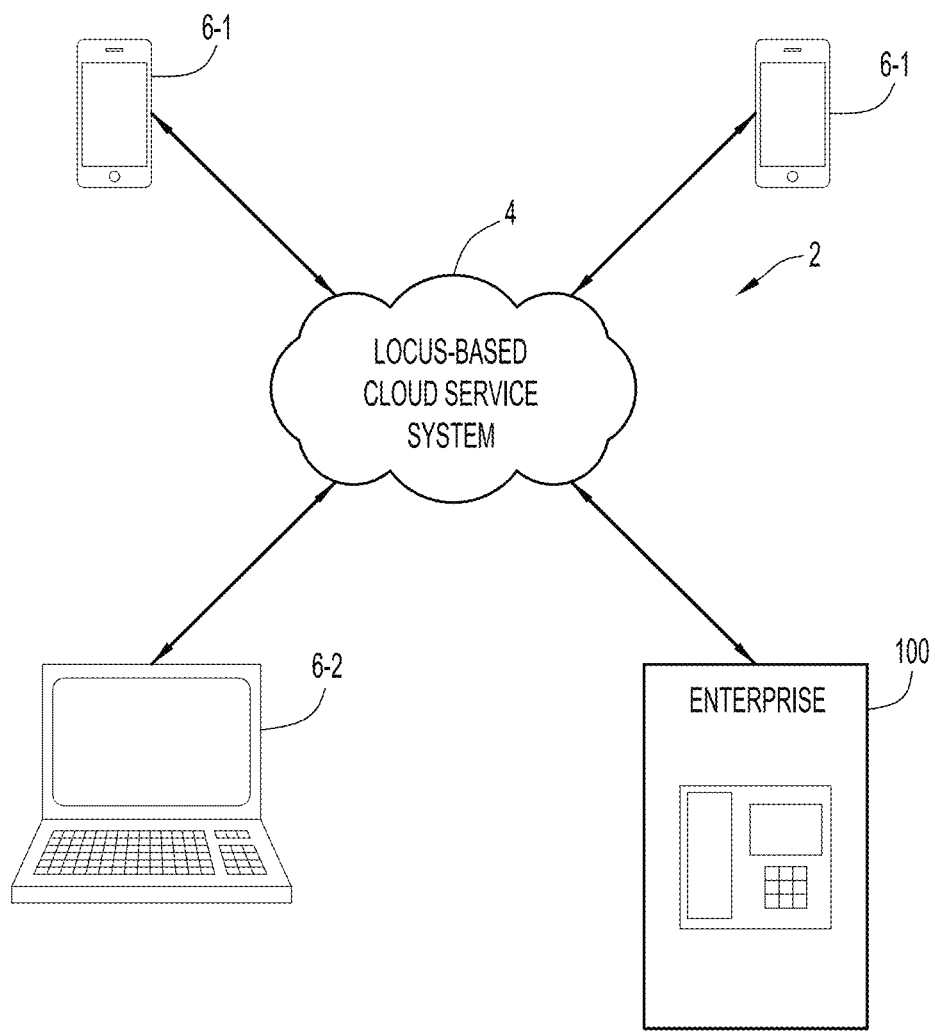
FIG. 1 is a schematic block diagram of an example embodiment of an environment including a cloud based system that hosts real-time communications between cloud based participants as well as enterprise based participants and utilizes a locus to monitor and maintain information about such real-time communications.

An example embodiment of a cloud based system 2 that hosts real-time communications between client devices is depicted in the schematic diagram of FIG. 1. It is noted that the cloud based system supports and maintains conversations between participants via their client devices (also referred to herein as clients), where the conversations provide a history of interactions between two or more participants. In particular, conversations comprise a container providing a history of any one or more types of real-time communications (e.g., audio and/or video calls, instant messages, etc.) between participants, email communications as well as sharing of files or any other types of content between participants.

The cloud based system 2 includes a locus-based cloud service system 4 (described in further detail in relation to FIG. 2) that hosts and supports communications and exchange of content between client devices 6 that subscribe to and are thus registered with system 4. Some examples of client devices include any suitable types of computing devices including, without limitation, personal computer (PC) devices, such as stationary (e.g., desktop) computers, or any other type of mobile computing device such as cellular (smart) mobile phones (e.g., cell phones, also referred to as mobile phones, such as phones 6-1 as depicted in FIG. 1), note pads, tablets, personal data assistant (PDA) devices (e.g., a laptop 6-2 as depicted in FIG. 1) and other portable media devices. Any number of enterprise systems (described in further detail herein), such as enterprise system 100, can also be registered with system 4 to facilitate communications between client devices and on-prem devices of the enterprise system 100 (e.g., in a manner as described herein). Briefly, the enterprise system 100 comprises a unified communications (UC) system for a business or organization that integrates and manages devices that are "on the premises" (also referred to herein as on-prem devices, such as desktop computers, desktop phones, laptops, etc.) for users (e.g., employees or members of the business or organization). As described herein, the locus-based cloud service system 4 can be configured to communicate with an enterprise system 100 to host conversations including real-time communications between client devices 6 and on-prem devices of the enterprise system 100.

The client devices 6, servers and other devices of the locus-based cloud service system 4 and enterprise system 100 can utilize any suitable operating systems (e.g., Android, Windows, Mac OS, Symbian OS, RIM Blackberry OS, Linux, etc.) to facilitate interaction, communications, exchanging media (e.g., audio and/or video) streams and sharing of other types of content between the various computing devices within system 1. In addition, the techniques described herein for managing conversations including real-time communications between participants and via the locus-based cloud service system 4 can be integrated with any suitable types of commercial software products and associated services that support online or web based media communications between client devices including, without limitation, WebEx (Cisco Systems, Inc.) and LotusLive (IBM Corporation).

The locus-based cloud service system 4 facilitates communications and exchange of content between client devices 6 and/or one or more enterprise systems 100 via any one or more suitable networks associated with the system 2 including, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. The number of client devices 6 and enterprise systems 100 is depicted in FIG. 1 for example purposes only, and it is noted that the network(s) of system 2 can support communications and exchange of content between any suitable number of client devices and enterprise systems via the locus-based cloud service system 4.

Figure 2:
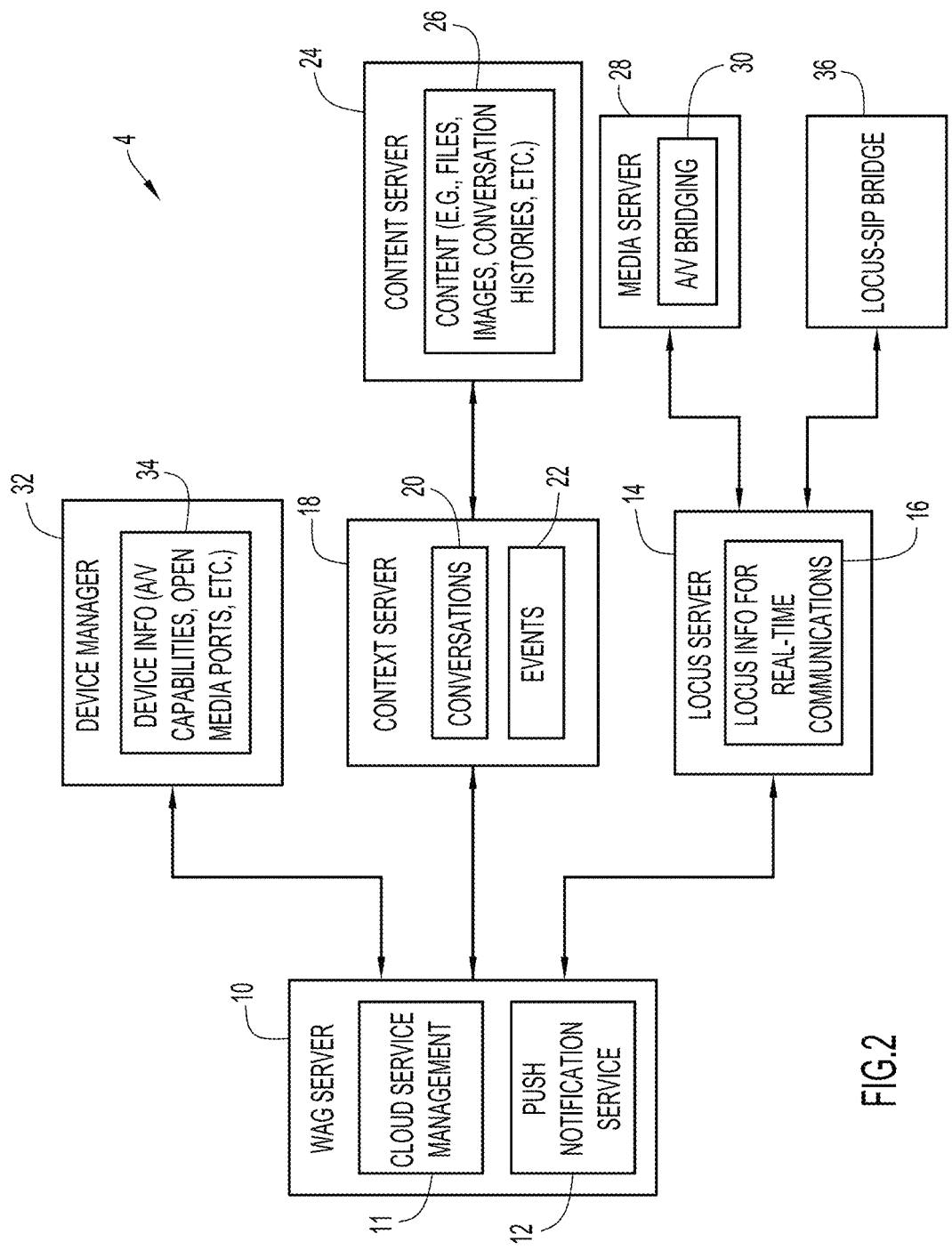
FIG. 2 is a schematic block diagram of an example locus-based cloud service system utilized for the environment of FIG. 1.

An example embodiment of the locus-based cloud service system 4 is depicted in the schematic diagram of FIG. 2 and includes a wireless application gateway (WAG) server 10, a locus server 14, a context server 18, a device manager 32, a content server 24, a media server 28, and a locus-to-SIP bridge server 36 that converts real-time communications in the locus-based cloud service system to SIP or other suitable signal protocols utilized by call agents of the enterprise system. Each server provides certain functions for the system 4 as described herein and includes components such as one or more network interfaces (e.g., one or more of an Ethernet interface card or switch, a modem, a router, etc.) that facilitates communication with the other servers, with client devices and/or any other components associated with system 2, one or more processors and memory comprising one or more tangible, non-transitory, computer readable storage media devices encoded with one or more software applications including computer executable instructions for execution by the processor to perform operations associated with hosting and supporting conversations by the system 4 as described herein. It is further noted that, while each server is depicted in FIG. 2 as a separate component, any two or more servers can alternatively be integrated as a single component or any suitable number of components over the system. For example, in certain embodiments, the device manager 32 and locus server 14 may be implemented as a single component.

The WAG server 10 facilitates communications between client devices 6 and the system 4 (e.g., via RESTful communications using HTTP protocol). The WAG server 10 provides an interface for client devices 6 to engage in services hosted by the system 4 (e.g., services associated with the device manager 32, context server 18, locus server 14 and media server 28 as described herein). In particular, the WAG server 10 includes one or more cloud service management applications 11 that provide an "in-cloud" representation of each client device 6 registered for the same user with the system 4 to directly manage services associated with each client device 6 when a WAG app (a WAG software application) is running on the client device. For example, each user may have one or more client devices 6 that are registered with the system 4 (e.g., a user may have one or more mobile phones, one or more laptops and/or tablets, one or more desktop phones, one or more on-prem devices associated with an enterprise system, etc.), and the WAG server identifies each client device associated with the single user as being associated with a single WAG account for the user, such that the same notifications of events as described herein are provided via event streams to each registered client device of the single user.

The WAG server 10 can also include other software applications including a push notification service application 12 that provides notifications to client devices when the WAG app of client devices is not currently running. The WAG server 10 communicates with each of the device manager 32, context server 18 and locus server 14 to provide services to client devices 6 including notifying client devices of conversations (e.g., real-time communications) that are occurring in the manner described herein.

The context server 18 includes a conversation module 20 comprising one or more software applications that manage information associated with conversations currently in progress (e.g., real-time communications) as well as historical information about conversations (e.g., previous conversations and information associated with such previous conversations). The term conversation, as described herein, refers to a container for references to information that is shared in relation to a group of participants associated with a common topic, where the common topic can be identified by participants of a conversation. For example, a conversation can include all communications between participants associated with an email chain, an instant message (IM) chain, a phone call linked with an email and/or IM chain, etc. The context server 18 further includes an events module 22 comprising one or more software applications that provide event information in the form of real-time event streams associated with users registered in the system 4, where one or more client devices 6 associated with each user is configured to receive such real-time event streams (via the WAG server 10) for notifying the user of conversation events (and other services hosted by the system 4) that relate to the user. For example, a user may have multiple client devices 6 (e.g., one or more mobile phones, one or more laptops or notepads, etc.) as well as one or more on-prem devices associated with an enterprise system 100 that are all registered with the locus-based cloud service system 4 such that each of these devices is registered for that particular user and is capable of receiving real-time event stream information associated with that user.

The event stream information provided by the events module 22 to client devices 6 associated with a user includes information about rendezvous points by which the user can engage in a real-time communications. Real-time communications, as described herein, refer to any type of communication hosted by the system 4 that is currently ongoing or occurs in real-time or near real-time, such as IM communications and audio/video phone call communications between client devices 6. Client devices 6 that are initially connecting online with the system 4 can communicate, via the WAG server 10, with the context server 18 to obtain event stream information regarding real-time communications that are in progress and to which the user is an invited participant. As described herein, a real-time communication session can be initiated by an originator participant (where a locus is also created by the locus server 14 as described herein and in relation to the real-time communication) resulting in an invitation event being sent to the event streams of client devices 6 associated with participants invited by the originator participant of the real-time communication session.

The context server 18 further communicates with a content server 24 that stores and maintains persistent content 26 such as documents, files, images and conversation histories (e.g., IM chat histories, email chain histories, recorded audio and/or video phone calls, etc.). This allows authorized client devices 6 to obtain access to such content for viewing at the client devices 6 (e.g., client devices that are associated with a user can obtain content from the content server 24 in relation to conversations associated with the user).

The device manager 32 stores information 34 associated with client devices 6 registered with the system 4. In particular, the device information 34 stored by the device manager 32 includes audio and video capabilities of client devices 6 for users as well as dynamic information including open media ports on which client devices prefer to receive encoded audio and video streams for a communication. The device manager 32 communicates with client devices 6 via the WAG server 10 to obtain device specific information for the client devices.

The locus server 14 creates and maintains a locus of real-time communications that are hosted by the system 4 at any given time. A locus created and maintained by the locus server 14 can comprise a topological view of a real-time communication that provides a "snapshot" or "picture" at any given time during the real-time communication of information associated with the real-time communication including an identification of participants actively engaged, an identification of participants not actively engaged but invited to the real-time communication and also an indication of participants that have dropped off the real-time communication as well as the client device(s) of the participants that are currently engaged in the real-time communication. The locus generated and maintained by the locus server 14 can be represented in the form of a graph including nodes that represent participants associated with the real-time communication. Thus, the locus server 14 manages each locus to provide constant updating to a locus as necessary in order to provide a listing of active (i.e., engaged) and idle (i.e., not engaged) participants associated with the real-time communication. For example, when participants join or leave a real-time communication, the locus server 14 updates the locus associated with the real-time communication. The locus server communicates such updates for the locus (e.g., via the WAG server 10) to the context server 18 so that participants associated with the real-time communication can receive updates, e.g., via the event streams provided by the context server to the client devices 6 of the participants. The locus server 14 further communicates with the WAG server 10 and the media server 28 to enable media services (e.g., audio and video media streams) to be provided to client devices 6 of participants during a real-time communication and based upon information for such client devices 6 as provided by the device manager 32.

The media server 28 includes an audio and video bridging module 30 that includes one or more software applications and/or hardware components to manage audio and video bridging as described herein between client devices 6 when a locus is created and real-time communications are established.

The locus-to-SIP bridge server 36 converts real-time communications in the locus-based cloud service system to SIP or other suitable signal protocols utilized by call agents of the enterprise system 100. As described herein, the enterprise system 100 includes a cloud connector system that enables the enterprise system 100 to receive information in relation to a locus as well as topology changes associated with that locus when a participant of a real-time communication described by the locus has an on-prem device registered with the enterprise system.

Figure 3:
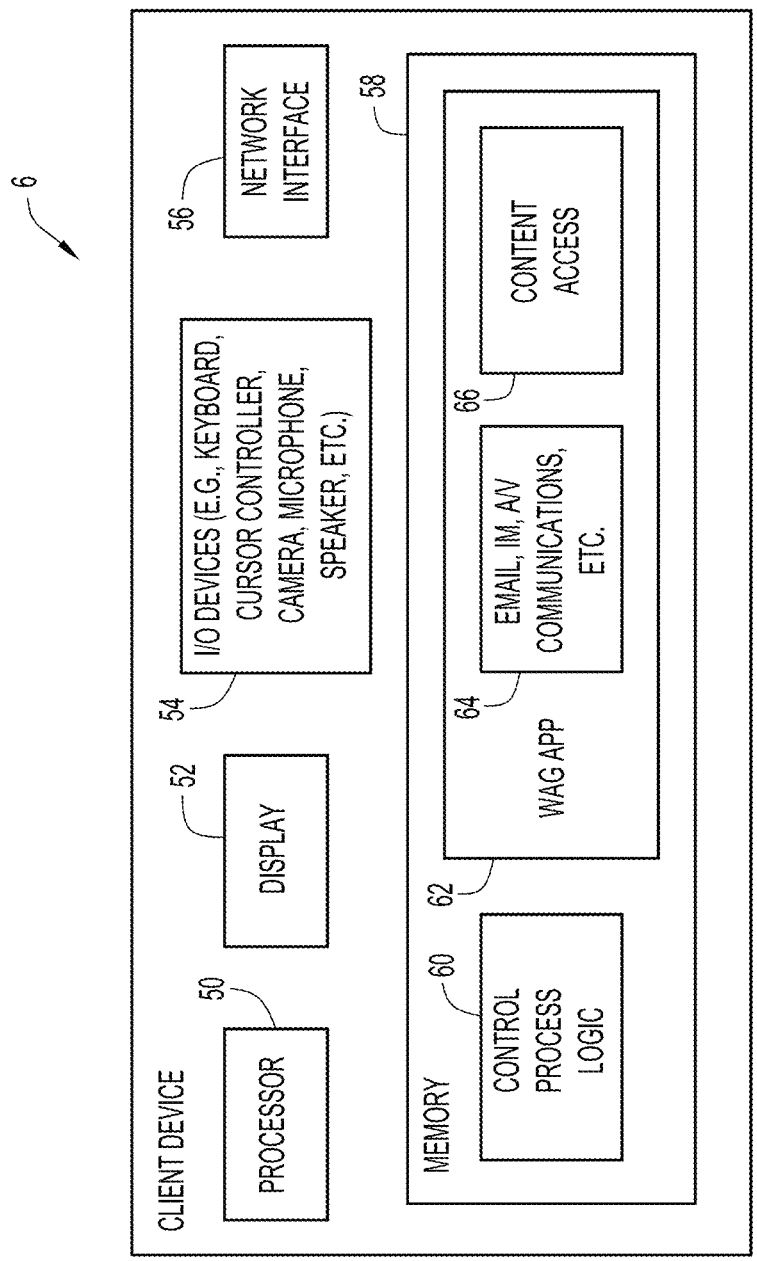
FIG. 3 is a schematic block diagram of an example embodiment of a cloud based client device that interacts with the locus-based cloud service system to engage in real-time communications with other client devices via the locus-based cloud service system of FIG. 2.

An example embodiment of a client device 6 that is registered with the system 4 of FIG. 1 is depicted in the schematic block diagram of FIG. 3. As previously noted, the client device 6 can be any suitable computing device (e.g., a stationary or desktop computer, or any type of mobile computing device such as a mobile phone, laptop, note pad, tablet, personal data assistant device, etc.) and includes a processor 50, a display 52 (e.g., LCD or any other suitable type of display), one or more suitable input and/or output (I/O) devices 54 (e.g., a keyboard, a cursor controller (e.g., mouse pad, touch pad or touch screen), a camera, a microphone, speaker(s), etc.), a network interface 56 (e.g., one or more of an Ethernet interface card or switch, a modem, a router or any other suitable hardware device that facilitates a wireless and/or hardwire connection over the one or more networks of system 2), and memory 58.

The memory 58 of each client device 6 may comprise read only memory (ROM), random access memory (RAM), magnetic disk storage media devices, optical storage media devices, flash memory devices, electrical, optical, or other physical/tangible memory storage devices, and any combinations thereof. The processor 50 can comprise at least one microprocessor that executes control process logic instructions 60 stored within memory 58 including operational instructions and software applications stored within such memory. In general, the memory 58 may comprise one or more tangible (non-transitory) computer readable storage media (e.g., a memory device) encoded with software comprising computer executable instructions and when the software is executed (by the processor 50) it is operable to perform the operations described herein for enabling cloud based multimedia services between the client device and other client devices over the system 2.

The WAG app 62 comprises one or more software applications stored within memory 58 that facilitates communications with the WAG server 10 to enable interactions between the client device 6 and the locus-based cloud service system 4 as described herein. In particular, the WAG app 62 includes a communication component 64 that enables the participant registered with the client device 6 to engage in conversations comprising various types of communications (e.g., email, IM, audio and/or video calls, etc.) with other participants over the system 4. The WAG app 62 also includes a content access component 66 that enables the client device 6 to obtain content stored by the content server 24 that is associated with the participant (e.g., content relating to a conversation to which the participant belongs, such as a chain of emails, a chain of IM communications, a recorded audio and/or video communication, etc.).

An example embodiment depicting how a conversation is generated and/or managed via the locus-based cloud service system 4 is now described with reference to the flowchart of FIG. 4 and the example embodiment of a locus (and a change in topology of the locus) as depicted in FIGS. 5A-5E.

Figure 4:
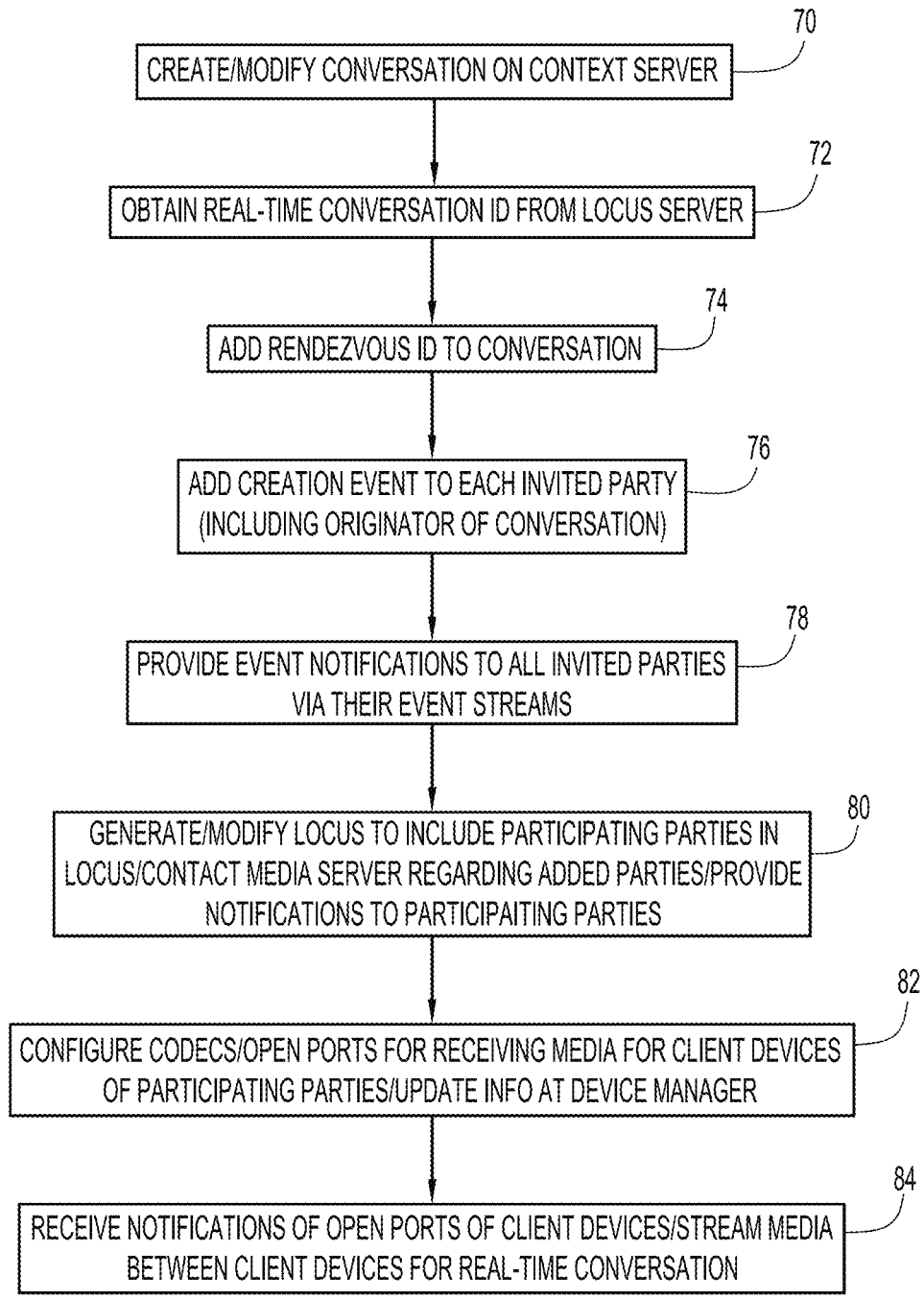
FIG. 4 is a flow chart depicting an example process for initiating and establishing a real-time communication utilizing the locus-based cloud service system of FIG. 2.

Referring to FIG. 4, a conversation stored by the context server 20 can be created or modified at 70 when an originating participant decides to request a communication such as a phone call to one or more other participants. In the example embodiments, originating participant Alice wishes to contact another participant Bob to engage in a phone call that involves audio and video streams. Alice, utilizing the WAG app 62 on her client device 6 (e.g., a mobile phone), communicates with the WAG server 10 to request a phone call with Bob. The WAG app 62 can include a suitable user interface (UI) that facilitates user control of the WAG app, where Alice provides Bob's contact information (e.g., by selecting Bob's information from a contact list stored by the client device 6) to the WAG server 10. The WAG server 10 communicates with the locus server 14 to obtain a conversation ID at 72. The conversation ID may be associated with a new conversation (e.g., if Bob and Alice never communicated before via their client devices, a new conversation with conversation ID can be created and stored via the conversations module 20) or an existing conversation (e.g., if Bob and Alice communicated before via their client devices, the existing conversation associated with Bob and Alice is utilized). The locus server 14 generates a rendezvous ID and adds it to the conversation associated with the conversation ID at 74. The rendezvous ID comprises a routable address that enables invited parties, via their client devices, to connect with each other over the system 4 so as to engage in the real-time communication (e.g., to exchange media comprising audio and video streams in the phone call between Alice and Bob).

Figure 6:
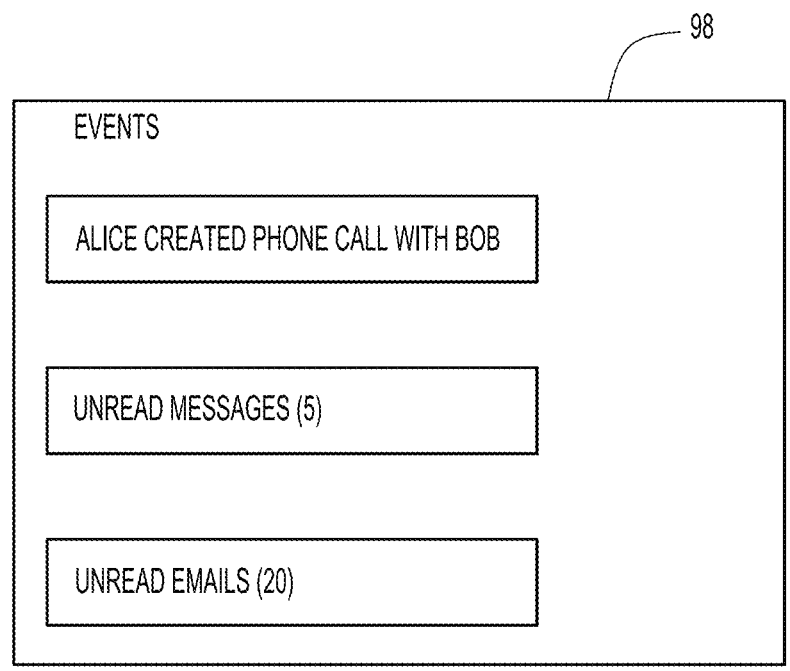
FIG. 6 is an example embodiment of a client device displaying an event notification stream associated with the example process depicted in the flow chart of FIG. 4.

At this point, the context server 18 and system 4 are aware of a real-time communication event to be established between the participants (Alice and Bob). At 76, a creation event is added by the context server 18 to the event streams of each invited party (via the events module 22), and event notifications are sent to the client devices 6 of all invited parties at 78 (including the originating participant). Thus, in the example embodiment, both Alice and Bob receive event notifications that each has been invited to join in the phone call. For example, a client device 6 of Alice (e.g., a mobile phone or note pad) can include an event stream 98 on its display 52 such as is depicted in FIG. 6, where the event stream 98 includes a notification to Alice (the originator of the phone call) that Alice has created a phone call with Bob (or some similar description). The event stream for Bob's client device 6 can also include a similar event notification, optionally with a further prompt requesting whether Bob would like to accept an invitation to the phone call. It is noted that notifications can be sent to a client device 6 of a participant when the WAG app 62 of the client device is active and currently monitoring communications with the WAG server 10 (e.g., via XMPP or any other suitable real-time communications protocol) and also when the WAG app 62 is inactive (e.g., not currently running) on the client device 6 (utilizing the push notification service 12 of the WAG server 10, which provides the client device 6 with notice, allowing the WAG app 62 to be opened and brought online for communications with the WAG server 10).

At 80, a locus is generated by the locus server 14 to provide a topological mapping of the real-time communication, where participants are identified as nodes within the locus. The locus is further modified as changes occur for information relating to the real-time communication, including the adding of nodes corresponding with participants connecting with the real-time communication and dropping nodes corresponding with participants leaving the real-time communication. The locus server 14 further communicates with the media server 28 in relation to added parties to facilitate a matching of client device attributes associated with the added parties (as obtained from the device manager 32) and available media ports associated with the media server 28 in relation to the real-time communication in order to establish flows of media streams for engaging client devices of the participating parties. Further, the locus server 14, WAG server 10 and context server 18 communicate to provide notifications via the event streams to the client devices to indicate participating parties and related information associated with the participating parties based upon the current topology of the locus.

Figure 5:
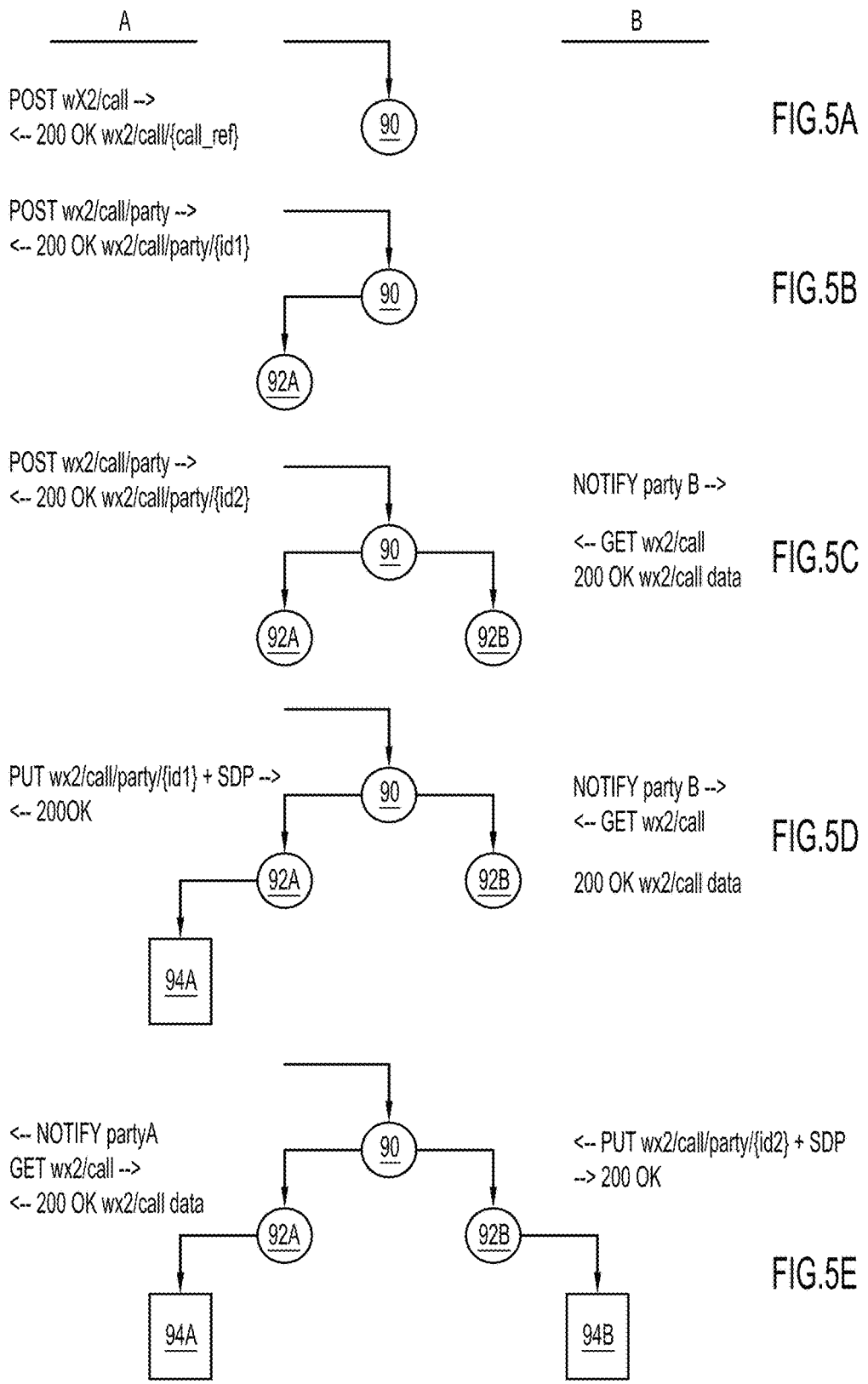
FIGS. 5A-5E are views of a locus represented as a topological graph and further showing the evolution of the locus as participants invited to join a real-time communication join the locus utilizing the locus-based cloud service system of FIG. 2.

The embodiment of FIGS. 5A-5E depict an example embodiment of a locus that is generated by the locus server 14 and further shows topology changes to the locus as participants are added to the real-time communication. Referring to FIG. 5A, a locus representing the real-time communication is initially generated based upon participant A (Alice) posting a communication request with participant B (Bob) via a user interface of the WAG app 62 of the client device 6, where WAG server 10 receives the request and communicates with the locus server 14 to facilitate creation of the locus and a rendezvous point represented by node 90. Notifications are added to the event streams (stored within the events module 22 of the context server 18) of invited participants (Alice and Bob) and sent to the client devices 6 of the invited participants. The locus topology changes in FIG. 5B with the addition of node 92A to the rendezvous point 90, indicating that participant A (Alice) has selected to join the communication, and the topology further changes in FIGS. 5C and 5D with the addition of node 92B which indicates that participant B (Bob) has selected to join the communication.

Referring again to FIG. 4, at 82, codecs are configured and receive ports for media are configured in relation to client devices 6 of participants based upon media descriptors for the participants. In particular, the device manager 32 has information regarding what types of media and associated codecs that one or more client devices 6 for each participant is capable of sending and receiving (where the information can be provided by each client device registered with the system 4, and optionally based upon information provided by a participant at the participant's client device when selecting to engage in a real-time communication). The locus can be configured to include such information, identified as data 94A and data 94B associated with nodes 92A and 92B, respectively. Based upon this information, client devices 6 of participants can query the locus (via the WAG server 10) to determine what types of media other client devices 6 of other participants are capable or desire to send and receive. The media server 28 is further provided such information in order to enable suitable bridging services for the client devices 6 to send and receive media at their open receive ports.

At 84, notifications are provided to the client devices 6 of participants in relation to open ports of the client devices associated with the real-time communication (as defined by the locus) and also types of media client devices can send and receive, and the real-time communication is enabled between the participants who have selected to engage in the communication.

The locus-based based cloud service system 4 differs from conventional call agents in that calls or other real-time communications are not pushed to client devices 6 of participants. Instead, invited participants to a real-time communication learn, through notifications provided in the event streams associated with the participants and provided to their client devices 6 registered with the system 4, of a real-time communication to which they are invited and they choose to add their client devices 6 to the locus that defines the real-time communication. This is the case even for the call or real-time communication initiator (i.e., the party that originates the real-time communication, such as Alice in the scenarios described herein). By selecting to engage in the real-time communication at one or more client devices 6 of each participant, such client device(s) connect at the designated rendezvous location hosted by the system 4 (and based upon configuring media ports and media streams based upon media descriptors associated with the client devices). The locus that is generated and maintained by the locus server 14 provides a high level "picture" in the form of a graph that defines the topology of the real-time communication, including participants invited to the real-time communication and participants actively engaging in the real-time communication as well as associated information for the client devices of such active participants, and changes the topology based upon changes in participants joining or leaving the real-time communication (with notifications being provided to participants of such topology changes to the locus). As described herein, this enables a number of useful features, including providing a participant with the ability to easily and readily connect back with a real-time communication when their client device 6 disconnects with the communication (e.g., when a mobile phone drops the call by losing its wireless signal) based notifications provided in the event stream of the client device 6, providing the participant with the option of connecting with a real-time communication utilizing any one or more client devices 6 registered with the system 4 (e.g., a participant decides to answer a call with a mobile phone instead of a desk phone, a participant decides to receive video content associated with the call at a laptop and the audio content at a mobile phone, etc.).

Example embodiments showing signal/communication flows that occur both within the system 4 (between locus server, device manager, media server and context server) and between client devices 6 and the system 4 (represented as the WAG-A and WAG-B for the WAG server representations of the client devices of Alice and Bob) are depicted in the flow diagrams of FIGS. 7-45. It is noted that the communication flows depicted in these figures provide examples of how communications occur between various components of the system 2. However, it is noted that operations to achieve the techniques described herein are not limited to such communication flows. Instead, it should be appreciated that the components of the system 2 can communicate in any suitable manner with each other to manage (via the locus) real-time communications between client devices.

The first series of flow diagrams of FIGS. 7-18 shows the series of communications between the various components of the system 2 of FIG. 1 to establish a locus-based real-time communication between Alice (represented as WAG-A in the flow diagrams) and Bob (represented as WAG-B in the flow diagrams). As previously noted, while each of the WAG server 10, locus server 14, context server 18, media server 28, and device manager 32 is depicted in the example embodiments as a separate component (where each of these provides distinct services to client devices 6 within system 4 as described herein), the system 4 can also be configured with any two or more of these servers integrated as any one or more servers and/or other suitable computing devices.

Figure 7:
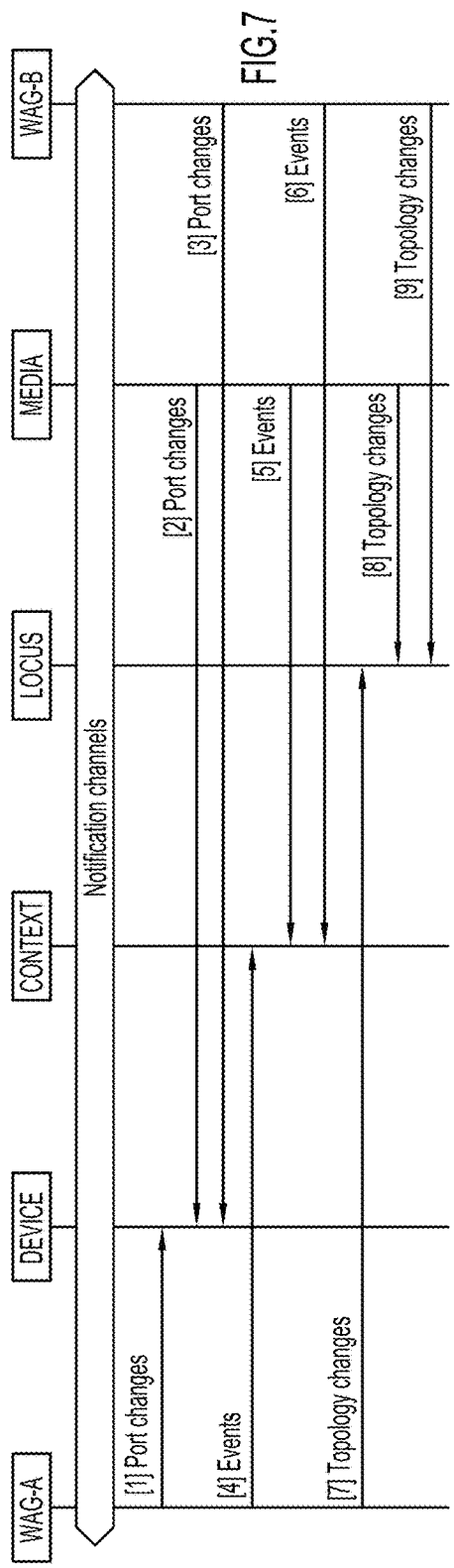

The communication flows depicted in FIG. 7 provide examples of notification channels between the system components to facilitate communication flows which provide notice to participant client devices when events associated with conversations occur. For example, a communication channel is provided between the device manager 32 and each of WAG-A (Alice's client device) and WAG-B (Bob's client device) to provide the device manager with information regarding which media descriptors are available for participant client devices (e.g., open media ports for the client devices of Bob and Alice). Communication channels are also provided between the context server 18 and each of WAG-A and WAG-B to monitor the event streams for Alice and Bob at their client devices 6. In addition, communication channels are provided between the locus server 14 and each of WAG-A, WAG-B and the media server 28 to enable topology changes to the locus that defines a real-time communication.

Figure 8:
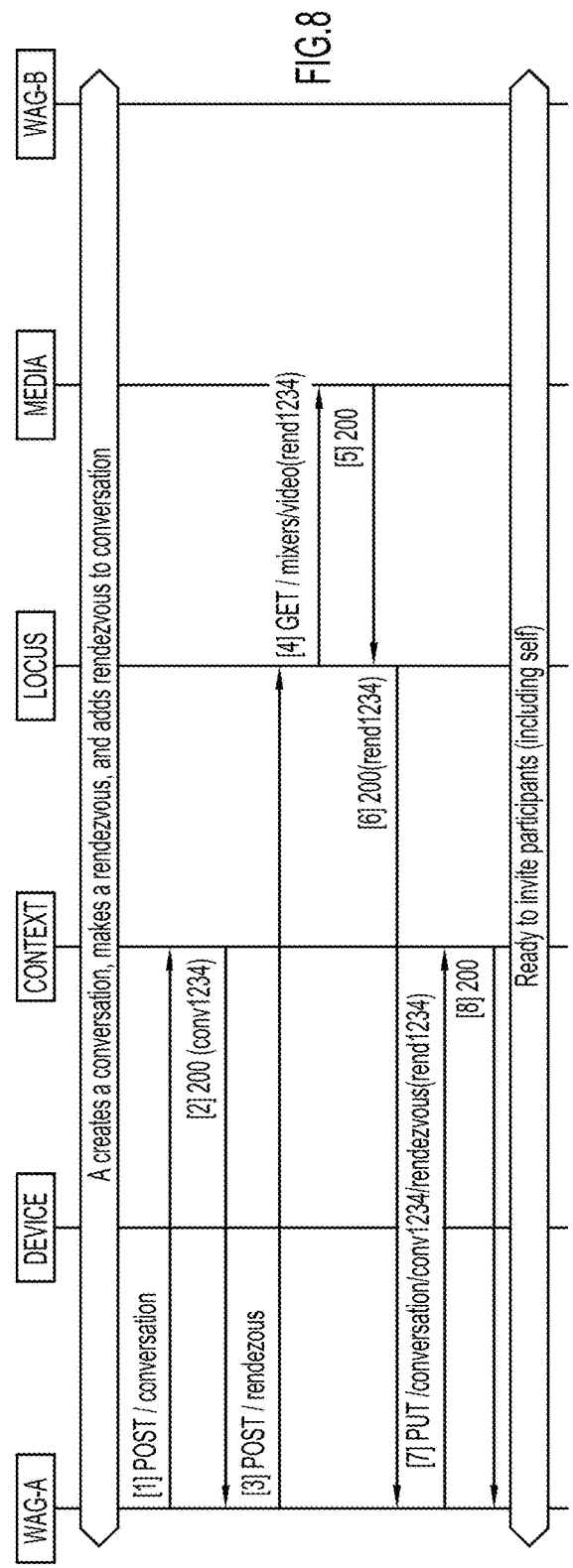

In this example scenario, Alice invites Bob to engage in a real-time communication (e.g., a phone call with media streams comprising audio and video) for the first time. This creates a conversation between Alice and Bob, with communication flows as shown in FIG. 8. In particular, a conversation is created via the communication messages between WAG-A and the context server 18 (messages [1] and [2]), and the conversation is stored in the conversation module 20. Alice can request the conversation via a suitable user interface provided by the WAG app 62 of her client device 6. Since the conversation element is a real-time communication (a phone call invite to Bob), WAG-A further communicates with the locus server 14 to obtain a rendezvous resource (including rendezvous ID for the rendezvous point to be created for the phone call) and the locus server 14 communicates with the media server 28 to obtain media stream information for the rendezvous ID (including mixers for the media streams) which is then provided to WAG-A (messages [3]-[6]). WAG-A posts the rendezvous resource information to the created conversation within the conversations module 20 of the context server 18 (messages [7] and [8]). At this point, a conversation has been created including information indicating a real-time communication is being established, a locus has been created that provides a topology of the real-time conversation, a rendezvous point has been established (with mixers allocated for the media streams) and designated participants (in this scenario, Alice and Bob) can be invited to the real-time communication (i.e., both Alice and Bob will be invited).

The next series of communications depicted in FIG. 9 sets up the invitation by the originator to participants of the real-time communication such that all participants, including the originator of the real-time communication (Alice in this scenario), may join the real-time communication. This occurs by WAG-A communicating with the context server 18 (shown as messages [1]-[4]) to post to the event streams of all invited participants (A for Alice and B for Bob) a notification of the conversation ID (e.g., conv1234 as shown in the drawings) and rendezvous ID (e.g., rend1234 as shown in the drawings). The context server 18 then provides notifications (messages [5] and [6]) within the event streams to WAG-A and WAG-B, where WAG-B (Bob) also may receive an invitation (message [7]) to join the conversation/real-time communication (e.g., via a push notification service 12 of the WAG server 10 to all of Bob's client devices 6 registered with system 4).

The addition of participants to the locus is depicted by the communication flow diagrams of FIGS. 10 and 11. In FIG. 10, WAG-A (Alice) communicates with the locus server 14 to add itself to the locus (messages [1] and [2]). This feature is also shown in the example embodiment depicting the locus topology in FIGS. 5A-5E, in which node 92A (representing Alice) is added to the locus topology in FIG. 5B. In FIG. 10, WAG-B (Bob) can accept the call invitation via message [1] (e.g., Bob selects an accept feature of a user interface associated with the WAG app 62 for Bob's client device 6), and WAG-B further communicates with the locus server 14 to add itself to the locus (messages [1] and [2], see also node 92B of FIG. 5C). In the communication flow diagram of FIG. 12, notifications of the topology changes to the locus are provided by the locus server 14 to WAG-A and WAG-B and also to the media server 28 (messages [1]-[3]).

Figure 13:
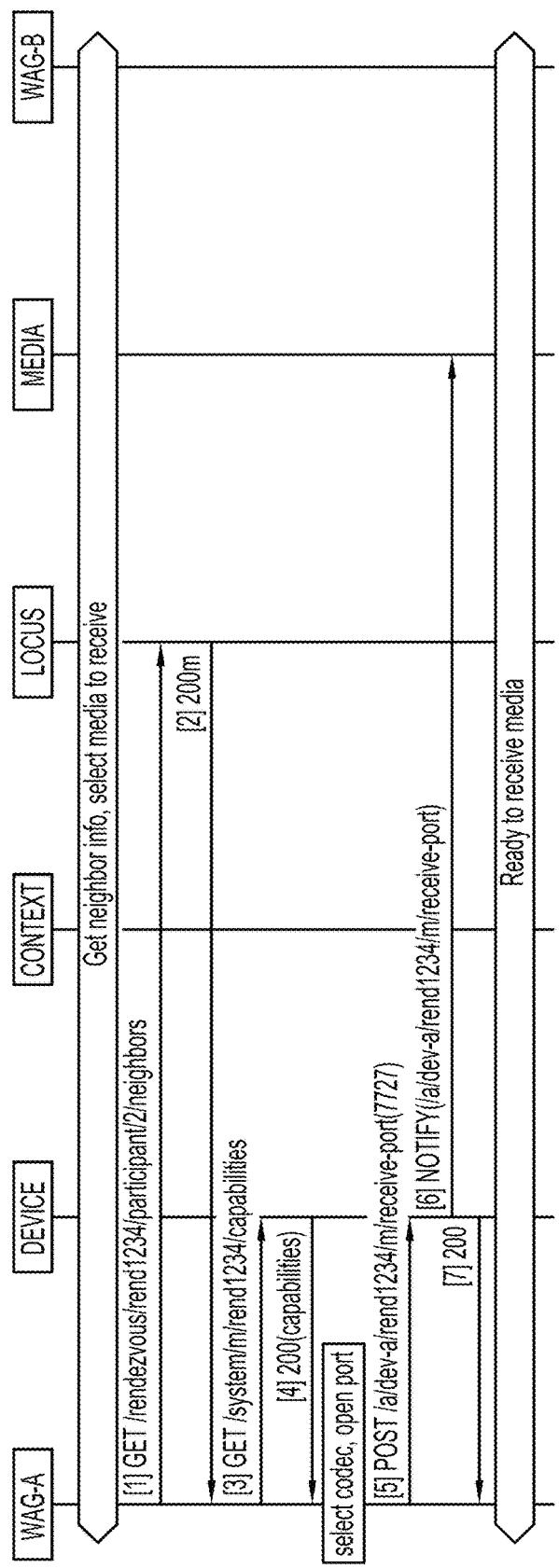

The media server 28 provides a media bridge (via A/V bridging module 30) for the rendezvous point, where connections between the media bridge, WAG-A and WAG-B are established via the communication flow diagrams of FIGS. 13-18. Referring to FIG. 13, WAG-A queries the locus server 14 to obtain information regarding the locus changes including information about its neighbor, the media bridge (messages [1] and [2]), and then queries the device manager 32 to obtain capability information (messages [3] and [4]) about the media descriptors for the client device 6 for WAG-A based and also the established media bridge for the rendezvous point (i.e., obtaining information regarding what types of media and codecs can this particular device and media bridge send and receive). Based upon this information, a match can be obtained to determine compatible types of media and codecs for receiving media streams by the client device 6 of WAG-A that are sent from the media bridge hosted by the media server 28 (e.g., compatible information may comprise WAG-A receiving an audio codec of g.711 on port X and a video codec of H.264 on port Y). WAG-A then posts the compatible information to the information 34 stored by device manager 32 and associated with this specific rendezvous point as well as suitable receive ports for client device 6 of WAG-A (message [5]). In addition (or as an alternative to storing such information at the device manager 32), such information can be stored by the locus server 14 as part of the locus for WAG-A (e.g., data 94A associated with node 92 for the locus as depicted in FIGS. 5D and 5E). The media server 28 is also notified about a change in the locus corresponding with the compatible information provided by WAG-A (message [6]).

Figure 14:
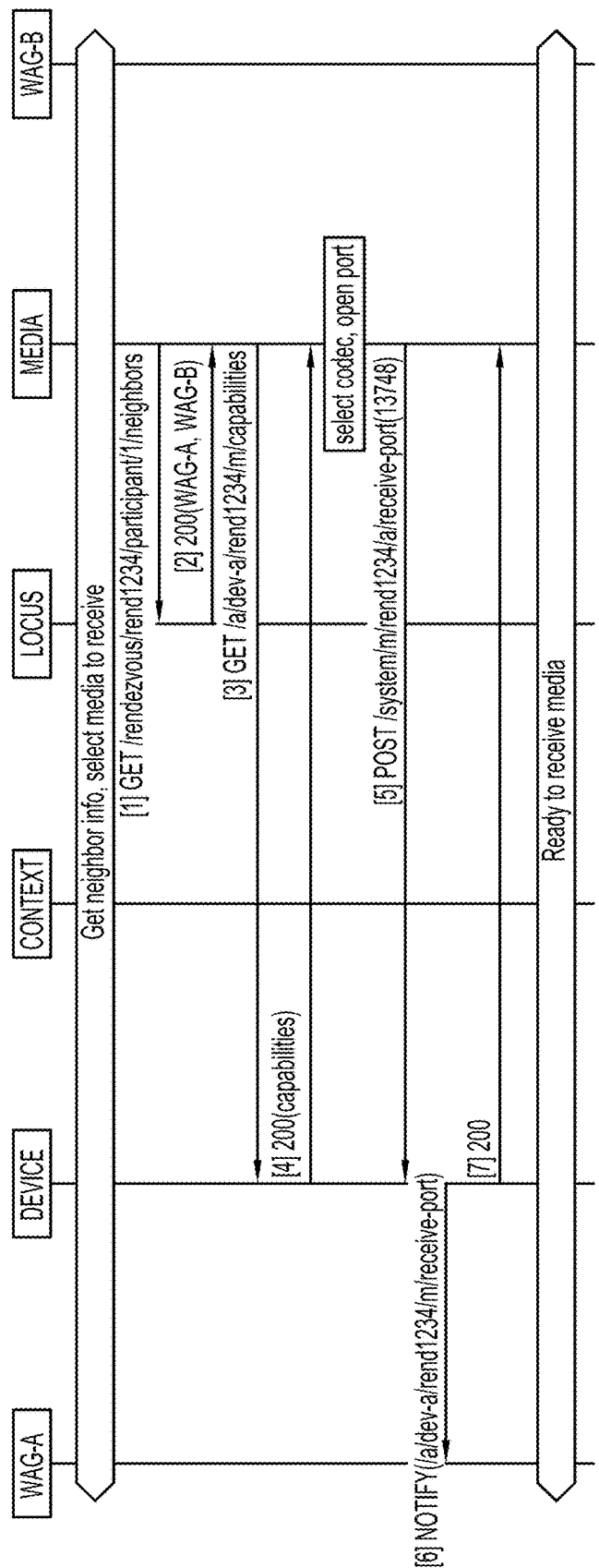

At FIG. 14, the media server 28 (after being notified via message [6] of FIG. 13) performs similar communications with the device manager 32 and locus server 14 to determine what types of media that can be sent by the client device 6 of WAG-A are compatible with the types of media the media bridge is capable of receiving. The first steps (messages [1] and [2]) are queries by the media server 28 regarding changes to the locus, and the next steps (messages [3] and

[4]) are queries by the media server 28 to the device manager 32 to obtain capability information (information regarding what types of media that can be sent by the client device 6 of WAG-A is the media bridge capable of receiving). The media server 28 next posts compatible information (requesting specific audio and video codecs at specific ports that the media bridge should receive from the WAG-A client device) to the device manager 32 and/or the locus maintained by the locus server 14 (message [5]), and WAG-A is notified of a change to the locus corresponding with the compatible information provided in relation to media codecs and receive ports for the media bridge (message [6]). At this point, the client device 6 of WAG-A is capable of sending and receiving media with the media bridge hosted by the media server 28.

Figure 15:
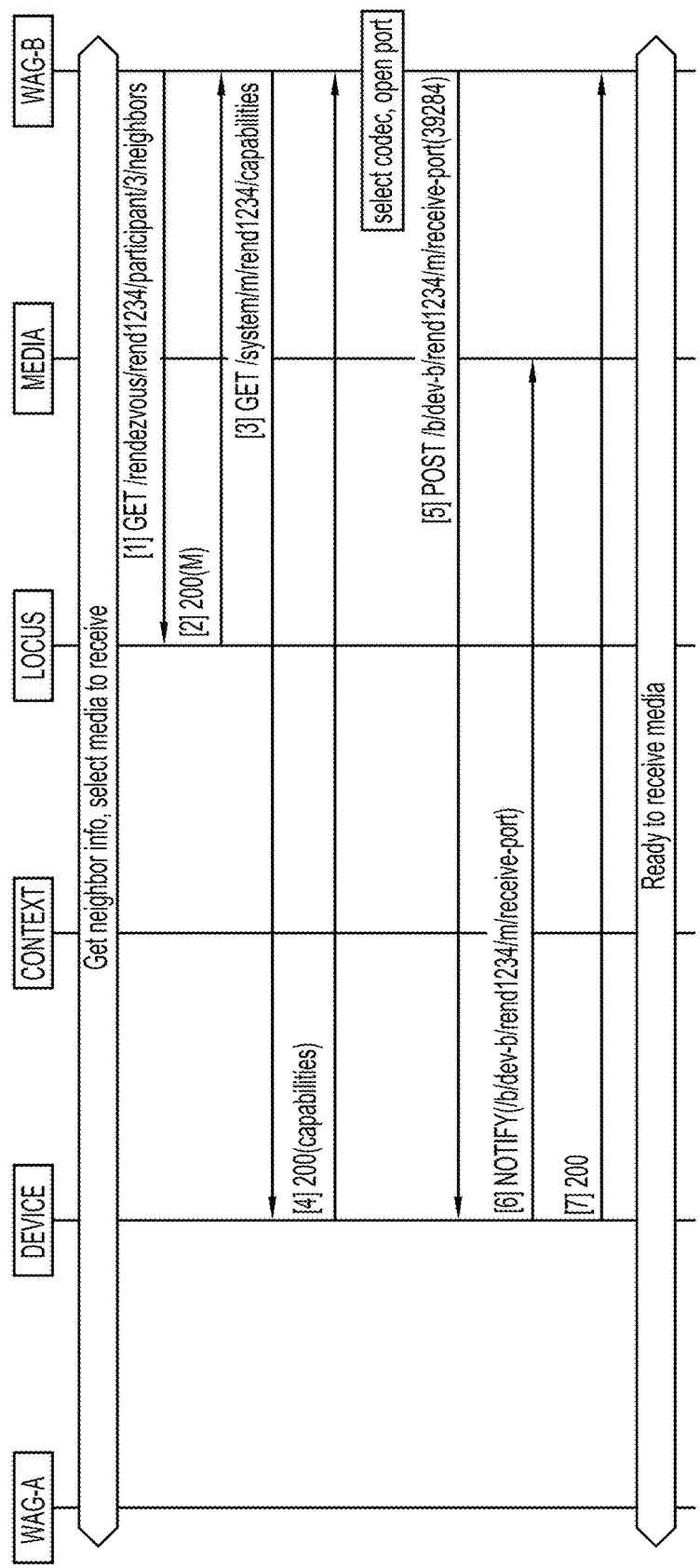

The same series of communications between WAG-A, the media server 28 and the locus server 14 as depicted in FIGS. 13 and 14 occurs for WAG-B so as to allow both WAG-B and the media bridge to provide media descriptors (e.g., audio and video codecs and open receive ports) for which each is capable of receiving the media streams from each other. This is represented in FIGS. 15 and 16 (where FIGS. 15 and 16 correspond with the previous descriptions of FIGS. 13 and 14 but in relation to WAG-B instead of WAG-A). At this point, the client device 6 of WAG-B is capable of sending and receiving media with the media bridge hosted by the media server 28.

Referring to FIGS. 17 and 18, each of WAG-A and WAG-B obtains information from the device manager 32 (and/or the locus) regarding what ports of the media bridge to send media (messages [1] and [2]), and then proceeds to send media at a suitable format (e.g., via RTP) to the specified ports of the media bridge (message [3]). The media server 28 performs similar communications with the device manager 32 (and/or the locus) to determine what ports of WAG-A and WAG-B to send media (messages [4] and [5]) and then proceeds to send media at the suitable format to the specified ports of WAG-A and WAG-B (message [6]). A two way media communication between each of WAG-A and WAG-B with the media bridge at the rendezvous point has now been established to permit Alice and Bob to communicate audio and video content with each other via their respective client devices 6. Thus, the locus and notifications (via event streams) to the client devices of participants facilitates the real-time communication between Alice and Bob that is hosted by the locus-based cloud service system 4.

The real-time communication that has been created between Alice and Bob as depicted in the communication flow diagrams of FIGS. 13-18 can also be modified to include additional parties with relative ease due to the real-time communication being established via a media bridge within system 4. An example scenario is now described with reference to the communication flow diagrams of FIGS. 19-24, in which Alice (WAG-A) desires to add another participant, Carol (represented as WAG-C), to the real-time communication. While the communication flow diagrams of FIGS. 19-24 only show WAG-A (Alice) and WAG-C (Carol), it is noted that WAG-B (Bob) is still engaged in the real-time communication while Carol is being added at the request of Alice.

Figure 22:
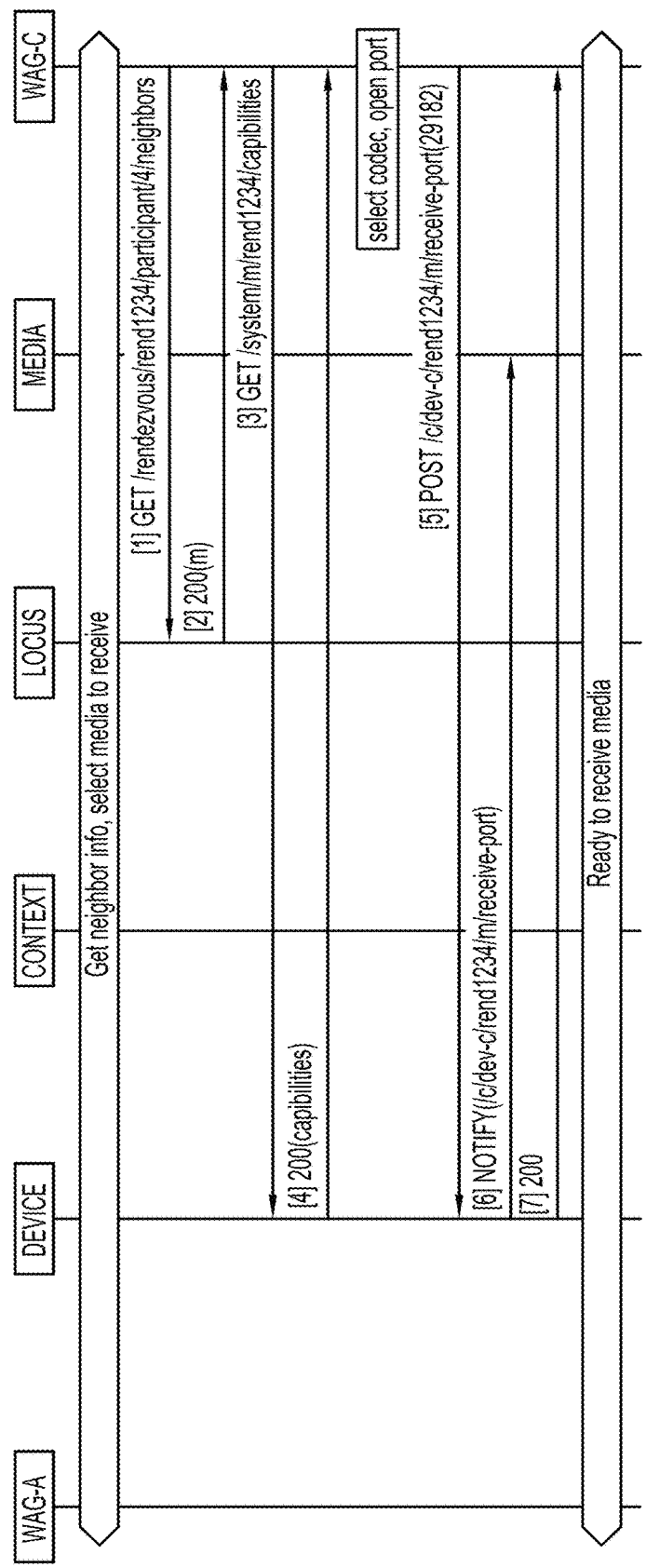
Figure 23:
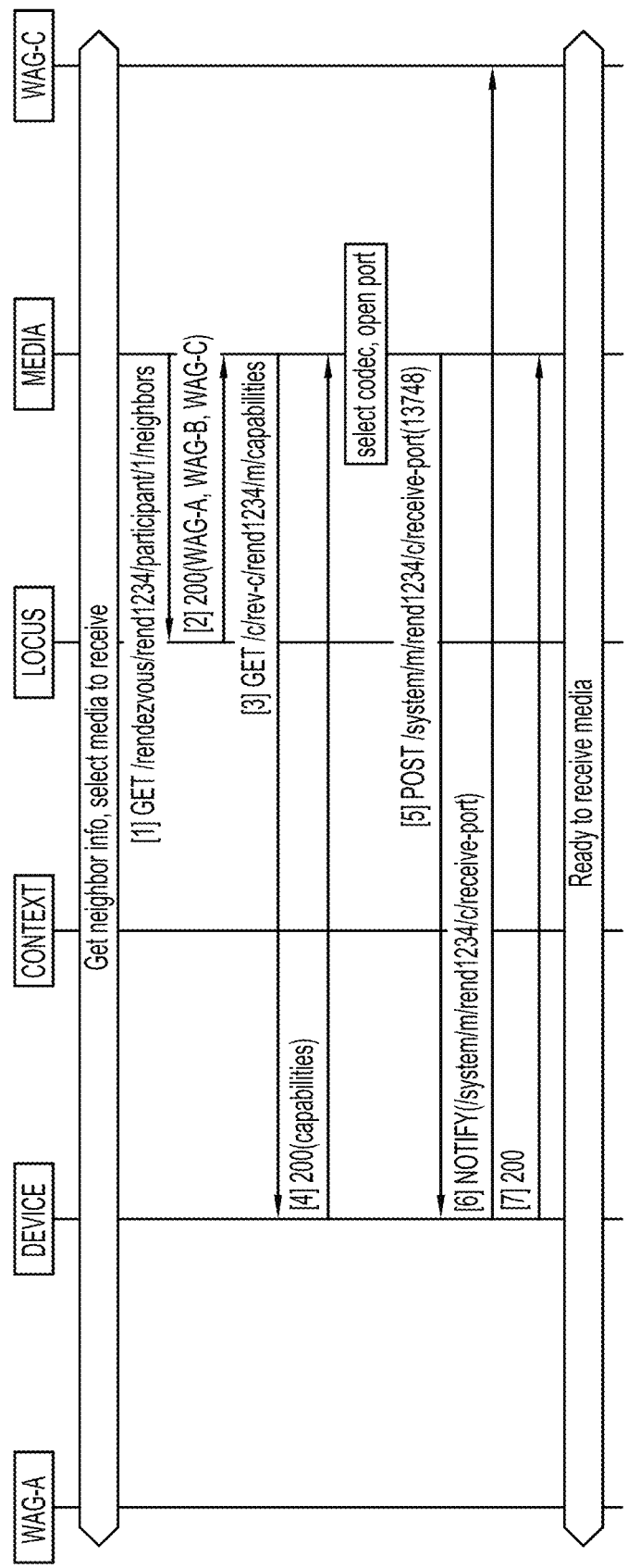

Referring to FIG. 19, when Alice requests to add Carol to the ongoing real-time communication (e.g., via the user interface associated with the WAG app 62 of the client device 6 of Alice), WAG-A posts an event to the context server 18 to send a notification of the real-time communication via the event stream of one or more client devices 6 registered with the system 4 and associated with WAG-C (Carol) indicating the ongoing real-time communication with the specific conversation ID and rendezvous ID (messages [1] and [2]). Each registered WAG-C client device 6 receives the notification of the real-time communication in its event stream (message [3]) along with an invitation regarding whether such client device 6 would like to join the communication (message [4]). The notification and request can be via the push notification service 12 of the WAG server 10 (e.g., in scenarios in which the WAG app 62 of a client device 6 of WAG-C is not open or active on the client device). In FIG. 20, WAG-C decides to accept the invitation (message [1], e.g., where Carol may make the acceptance selection via the user interface associated with the WAG app 62 of her client device 6). Upon acceptance by WAG-C of the invitation, WAG-C adds itself as a node to the locus (messages [2] and [3]). This results in a topology change made by the locus server 14 to the locus, which further results in notifications to all participants of the real-time communication (in this scenario, WAG-A, WAG-B and WAG-C) of the topology change. An example notification sent to WAG-C and the media server 28 of the topology change based upon the addition of Carol to the real-time communication is depicted in the messages flows of FIG. 21. A similar series of communication messages that occurred for FIGS. 13-16 as previous described herein also occurs between WAG-C, the media server 28 and the locus server 14 so as to allow both WAG-C and the media bridge to provide media descriptors (e.g., audio and video codecs and open receive ports) for which each is capable of receiving the media streams from each other. This is represented in FIGS. 22 and 23. At this point, the client device 6 of WAG-C is capable of sending and receiving media with the media bridge hosted by the media server 28.

Referring to the communication messages of FIG. 24, WAG-C obtains information from the device manager 32 (and/or the locus) regarding what ports of the media bridge to send media (messages [1] and [2]), and then proceeds to send media at a suitable format (e.g., via RTP) to the specified ports of the media bridge (message [3]). The media server 28 performs similar communications with the device manager 32 (and/or the locus) to determine which ports of WAG-C to send media (messages [4] and [5]) and then proceeds to send media at the suitable format to the specified ports of WAG-C (message [6]). Having established a two way media communication between WAG-C and the media bridge at the rendezvous point, Carol is now engaged in the real-time communication with Alice and Bob (i.e., a three-way conference call has been established in which each party can send and receive audio and video content for this real-time communication).

In another example scenario supported by the system 4, when the client device 6 of a participant disconnects with a real-time communication (e.g., inadvertently due to loss of communication signal of a client device for any number of reasons, such as user is connected with system 4 using a registered mobile phone and is driving and enters a tunnel or an area with no signal service, user is connected with system 4 using a registered laptop and loses a WIFI signal connection provided by a WLAN network, etc.), a re-connection with the real-time communication can be easily established by referencing the locus associated with the communication and supported by the locus serve 14 as well as receiving notifications provided by the context server 18 in the event streams for the client device 6 when the client device is brought back online (i.e., signal to the client device is restored) and in communication with system 4. The communication flow diagrams of FIGS. 25-32 depict communication message flows associated with a scenario in which a client device 6 of WAG-A (Alice) loses its connection with the real-time communication established based upon the previous scenarios (also depicted by the communication flow diagrams of FIGS. 7-24).

Referring to FIG. 25, the existing notification channels are shown (messages [1]-[3]) when WAG-A is currently connected, where such notification channels allow a client device of WAG-A to receive notification of any changes associated with a client device (e.g., port changes accessible via the device manager 32 and/or locus server 14, event notifications provided by the context server 18, and locus topology changes maintained by the locus server 14).

Figure 26:
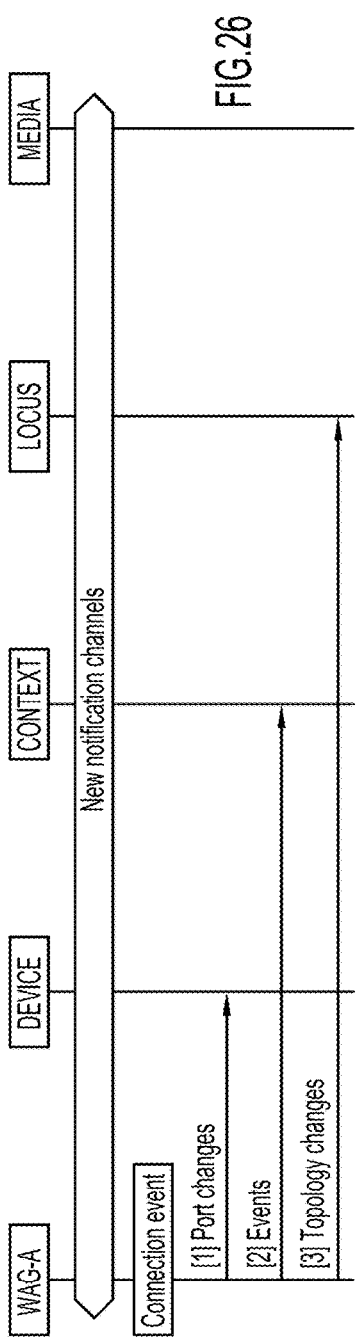
Figure 27:
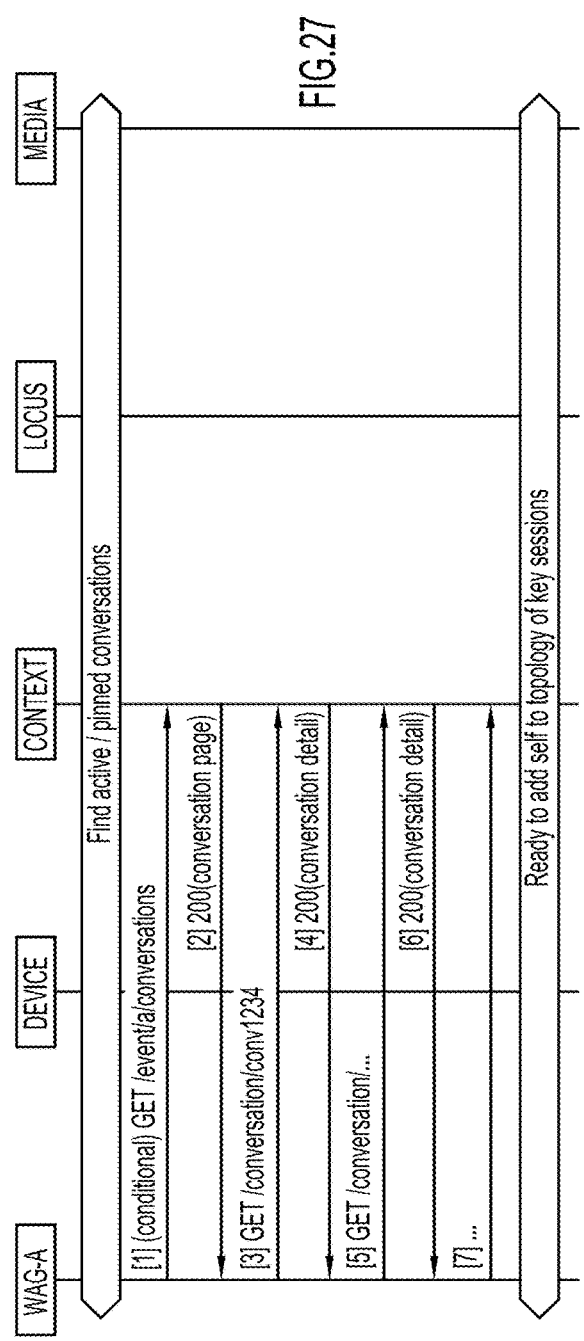
Figure 32:
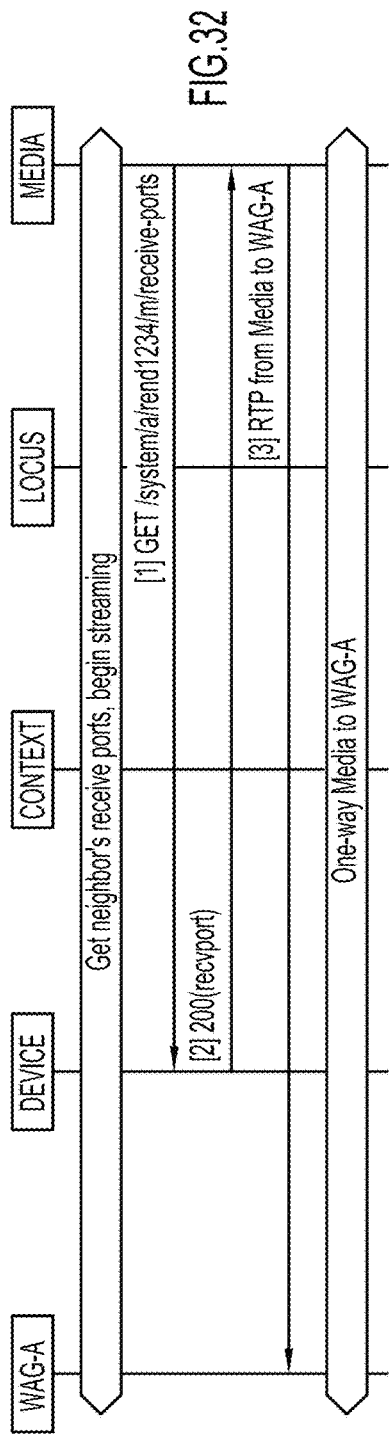

In a scenario in which the client device 6 of WAG-A is disconnected (e.g., due to signal loss of a mobile phone or other mobile device), WAG-A reconnects by initially establishing new notification channels within system 4 as depicted in FIG. 26 (messages [1]-[3]). Referring to FIG. 27, WAG-A can easily find any active conversations that may be currently in progress by obtaining events from the event stream associated with WAG-A from the context server 18 (messages [1] and [2]). From the information obtained about active conversations, WAG-A can further obtain information from the context server 18 to determine which active conversations may include ongoing real-time communications (including conversations associated with messages [3]-[7]), one of which is the conversation (conv1234) that includes the ongoing real-time communication from which WAG-A was recently disconnected.

Referring to FIG. 28, WAG-A requests the locus server 14 to add WAG-A back to the locus and a node representing WAG-A is then re-added to the locus (messages [1] and [2]). This occurs in the event the locus server 14 has already updated/changed the topology of the locus by removing the WAG-A node (due to an indication that WAG-A disconnected from the real-time communication). In the event locus server 14 has not yet removed the node representing WAG-A as previously connected with the real-time communication from the locus (e.g., disconnection and reconnection by WAG-A occurs before the locus server 14 refreshes and updates the topology of the locus), the locus server 14 discards the previous node associated with WAG-A being previously connected with the real-time communication before adding a node representing WAG-A (newly joined) to the locus. In this scenario, WAG-A requests its addition to the locus topology as a one-way participant in which WAG-A receives but does not send media in relation to the real-time communication.

Referring to FIG. 29, the notifications are sent to event streams of participants and the media server 28 relating to topology changes to the locus (e.g., messages [1] and [2] providing notifications that the locus topology has changed to WAG-A and the media server). Referring to FIG. 30, WAG-A again obtains information about the media bridge from the locus server 14, and also obtains capability information from the device manager 32 to determine what types of media to receive at the client device 6 of WAG-A, followed by posting such information to the device manager 32 and/or locus. The media server 28 also obtains information about the participants (including WAG-A) from the locus server 14 and determines what types of media to receive from the client devices of the participants. The message flows for FIGS. 30 and 31 are similar to those that occur in relation to FIGS. 13 and 14, with the exception that, the present connection by WAG-A of its client device 6 to the media bridge is only a one-way connection (as indicated by the initial posting by WAG-A to add it to the locus topology in FIG. 28). Thus, the media server 28 does not need to establish types of media codecs to receive from WAG-A (since not media streams are being sent by the client device 6 of WAG-A). At FIG. 32, the media server 28 communicates with the device manager 32 (and/or the locus) to determine which ports of WAG-A to send media (messages [1] and [2]) and then proceeds to send media at the suitable format to the specified ports of WAG-A (message [3]). Thus, the client device 6 of WAG-A receives media streams for the real-time communication from the media bridge but no media streams are sent by the WAG-A client device to the media bridge (i.e., Alice only listens into the call by receiving audio and video content for the call but is not actively engaging in the call since no audio or video content is being sent from Alice's client device).

Figure 33:
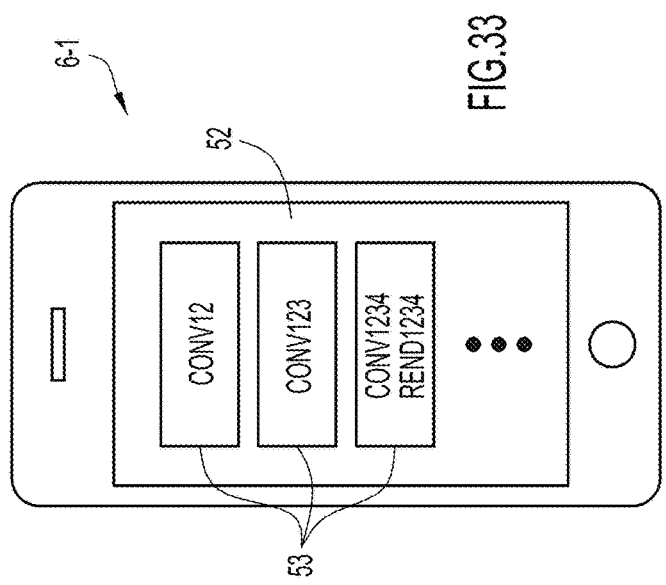
FIG. 33 depicts a schematic embodiment of a client device including a display with tiles presented that represent conversations associated with a user of the system of FIG. 1.

The designation by WAG-A of a one way media stream (receive media only) for its client device 6 with the media bridge may be based upon different reasons depending upon particular scenarios. In an example embodiment, the WAG app 62 of a client device 6 can be configured with features that present a series or listings of icons or tiles on the display 52 of the client device representing conversations having current events (as identified by the event stream provided from the context server 18 to the client device 6, see messages [1]-[7] of FIG. 27). An example embodiment is depicted in FIG. 33 of a client device 6-1 in the form of a mobile phone, in which a listing of images or tiles 53 are presented on display 52 that represent and provide information about conversations, some of which including real-time communications associated with the conversations (such as rend1234 associated with conversation 1234 representing the real-time communication between WAG-A, WAG-B and WAG-C for the scenarios depicted with reference to FIGS. 7-32). The participant (e.g., Alice/WAG-A) can select a tile 53 for monitoring the real-time communication at the device without becoming actively engaged (i.e., Alice only receives audio and video content from the call but does not send any audio or video content).

Figure 35:
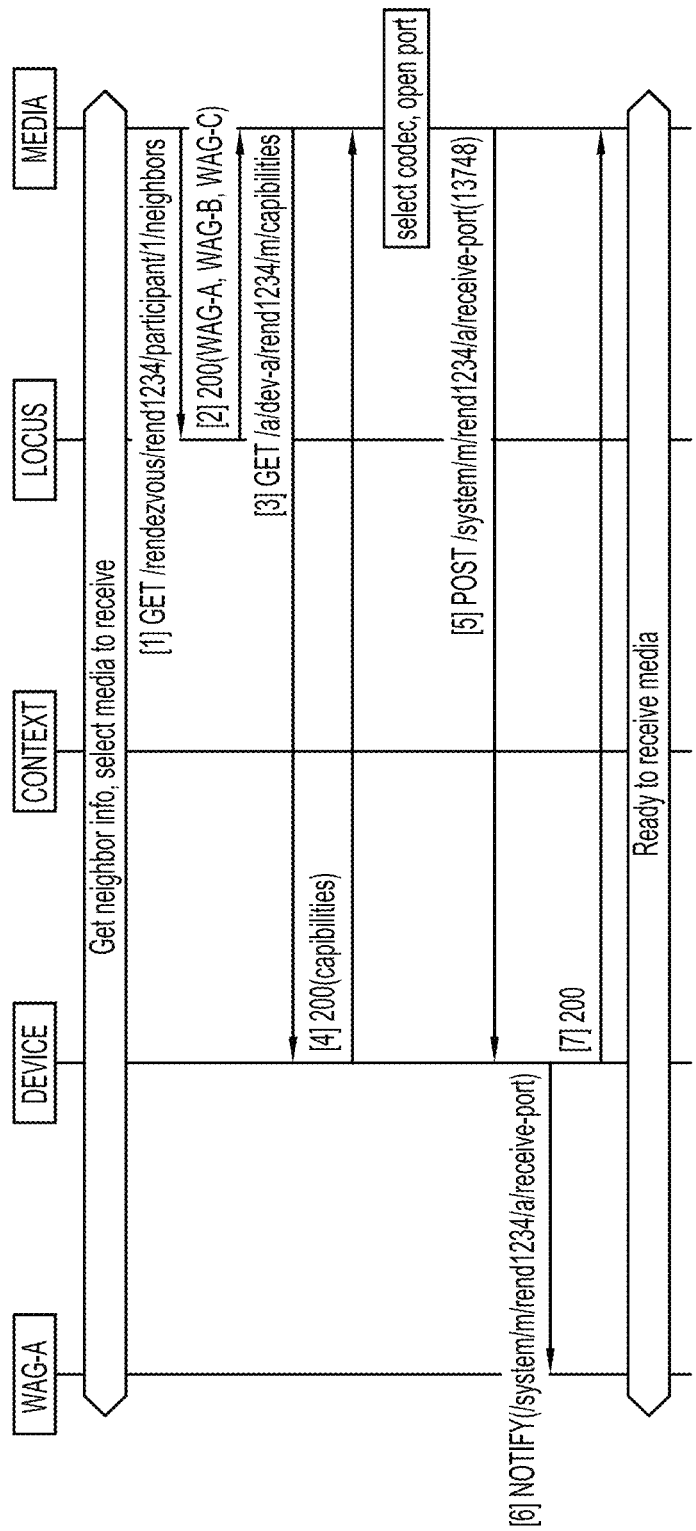
Figure 36:
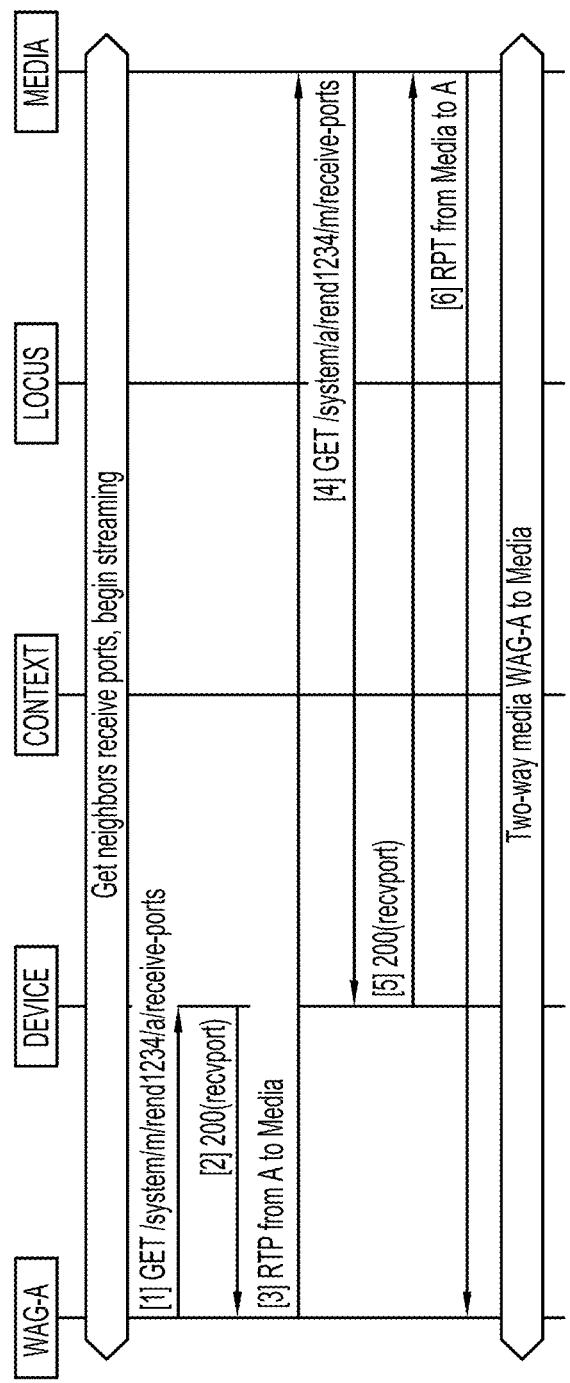

The WAG app 62 of the client device 6 can further be configured to communicate with the system 4 such that a tile 53 representing a current or ongoing real-time communication is converted into a full view on the display 52 of the client device 6 with two-way media streams being established between the client device 6 and the media bridge (i.e., the client device and media bridge both send and receive media streams in relation to each other). This can be implemented by a user/participant of the client device 6 electing to actively engage in the real-time communication by selecting the tile 53 of interest. The communication flows between components of the system 2 which enable the one-way to two-way media stream conversion between client device 6 and media bridge are depicted in FIGS. 34-36.

Figure 34:
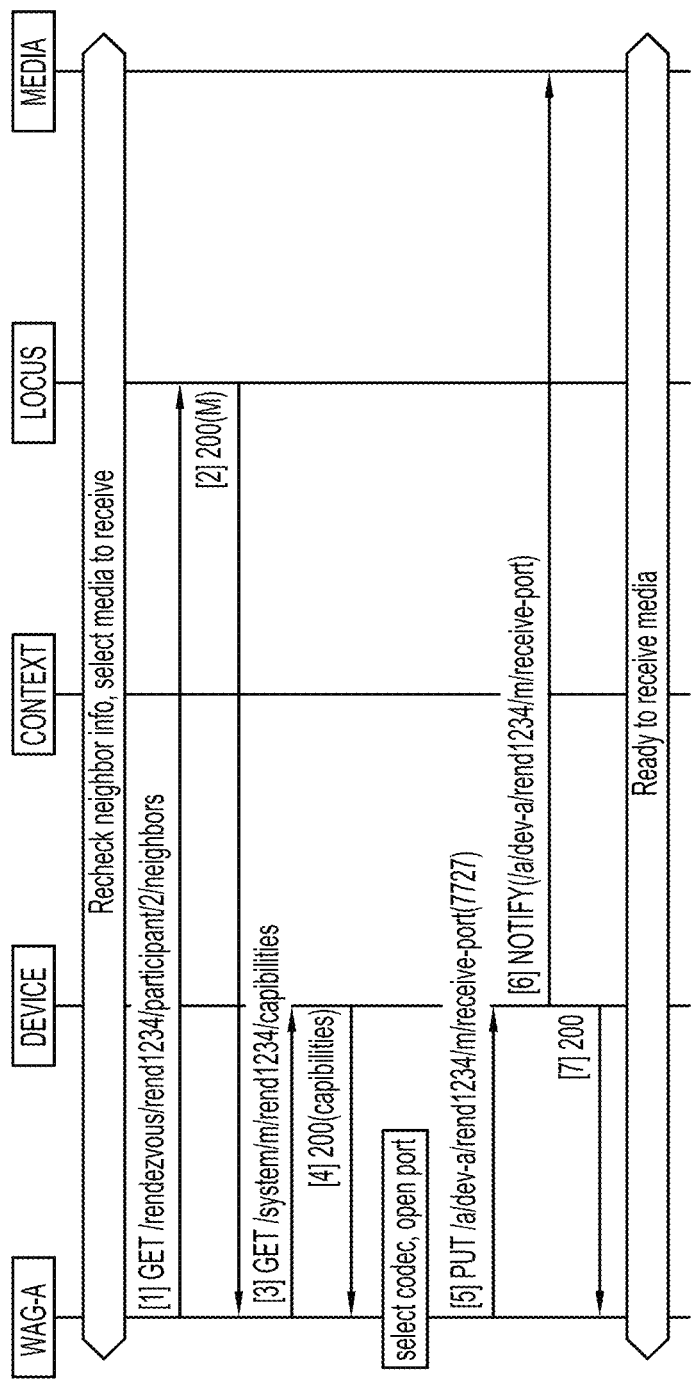
FIGS. 34-36 are communication/signal flow diagrams depicting an example embodiment of signal flows between a client device and components of the locus-based cloud service system of FIG. 2 in relation to the client device going into full view within a current or ongoing real-time communication.

Referring to FIG. 34, WAG-A is currently in one-way mode (receiving media from the media bridge) and selects a change to two-way mode (to enable the client device 6 of WAG-A to also send media streams to the media bridge), where WAG-A gets information relating to the media bridge and determines media descriptor capability information (messages [1]-[4]). WAG-A then posts the media descriptor information (e.g., audio and video codecs, open receive ports) for what its client device is capable of sending and receiving to the media bridge and the media server 28 is notified (messages [5]-[7]). At FIG. 35, the media server 28 gets information about WAG-A and determines media descriptor capability information (messages [1]-[4]), then posts media descriptor information for what media streams the media bridge is capable of sending and receiving in relation to the WAG-A client device with a notification also being sent to the WAG-A client device (messages [5]-[7]). At FIG. 36, two-way media streams are enabled between the client device 6 of WAG-A and the media bridge (messages [1]-[6]) such that Alice has now re-joined (or fully joined) the conversation (i.e., Alice is now sending and receiving audio and video content in the call).

Thus, the system 4 enables the user of a client device to re-join a conversation (e.g., if the user's client device disconnects from a real-time communication session associated with the conversation) by simply obtaining information from the locus server 14 in relation to the current topology of the locus as well as receiving event notifications in the event stream associated with the user and via the context server 18.

As previously noted, the system 4 also enables users/ participants of a real-time communication to engage in the communication with two or more client devices 6 associated with the user (i.e., the user has multiple client devices registered via the same WAG account with the WAG server 10). For example, a participant of a real-time communication may desire to receive audio content for a real-time communication on one client device 6 (e.g., a mobile phone) while receiving video content for the real-time communication on another client device 6 (e.g., a laptop or other computing device having a larger display in relation to the mobile phone).

An example embodiment of communication flows between components of the system 2 that enable splitting of media flows between two or more client devices of a participant of the real-time communication is depicted in FIGS. 37-46. This example relates to the previous scenarios in which Alice (WAG-A) engages in a real-time communication with Bob (WAG-B) and/or Carol (WAG-C). The communication flow diagrams depicted in FIGS. 37-46 only show the client devices 6 of Alice (WAG-A and WAG-A2) in order to simplify the diagrams.

Referring to FIG. 37, the flow diagram shows the notification channels utilized for enabling the WAG-A and WAG-A2 client devices of Alice to engage in the real-time communication, where the notification channels. In this scenario, Alice is already engaged in the real-time communication in which her WAG-A client device sends and receives media to and from the media bridge (two-way send/receive mode, represented by message [1]). Establishing the connection between WAG-A and the media bridge has been previously described in relation to FIGS. 7-36. As is evident from FIG. 37, WAG-A2 (representing the second client device 6 of Alice that is registered with the system 4 with the same WAG account) is also able to communicate with device manager 32, locus server 14 and context server 18 in the same or similar manner as previously described for WAG-A (via messages [2]-[4]).

Referring to FIG. 38, WAG-A2 finds active conversations (including conv1234) and real-time communications associated with the active conversations (including current or ongoing real-time communication with the rendezvous point defined by rend1234) via notifications in the event stream associated with the WAG-A account received from the context server 18 (messages [1]-[5]). This occurs when Alice decides that she wants to utilize a second client device 6 defined as WAG-A2 (e.g., a laptop, a tablet device or other computing device, where the first client device 6, defined as WAG-A, can be Alice's mobile phone), and interacts with the WAG app 62 on the second client device 6 to view conversation notifications in the event stream associated with her WAG account. At FIG. 39, WAG-A2 adds itself to the locus by communicating with the locus server 14 in a manner similar as previously described in relation to how all other WAG devices are added to the locus (messages [1] and [2]). This results in a change in the locus topology by the locus server 14 (where a node is added to the locus representing WAG-A2), resulting in locus topology change notifications being sent to event streams of WAG client device 6 engaged in the real-time communication, as depicted in FIG. 40 (messages [1]-[3]).

Figure 41:
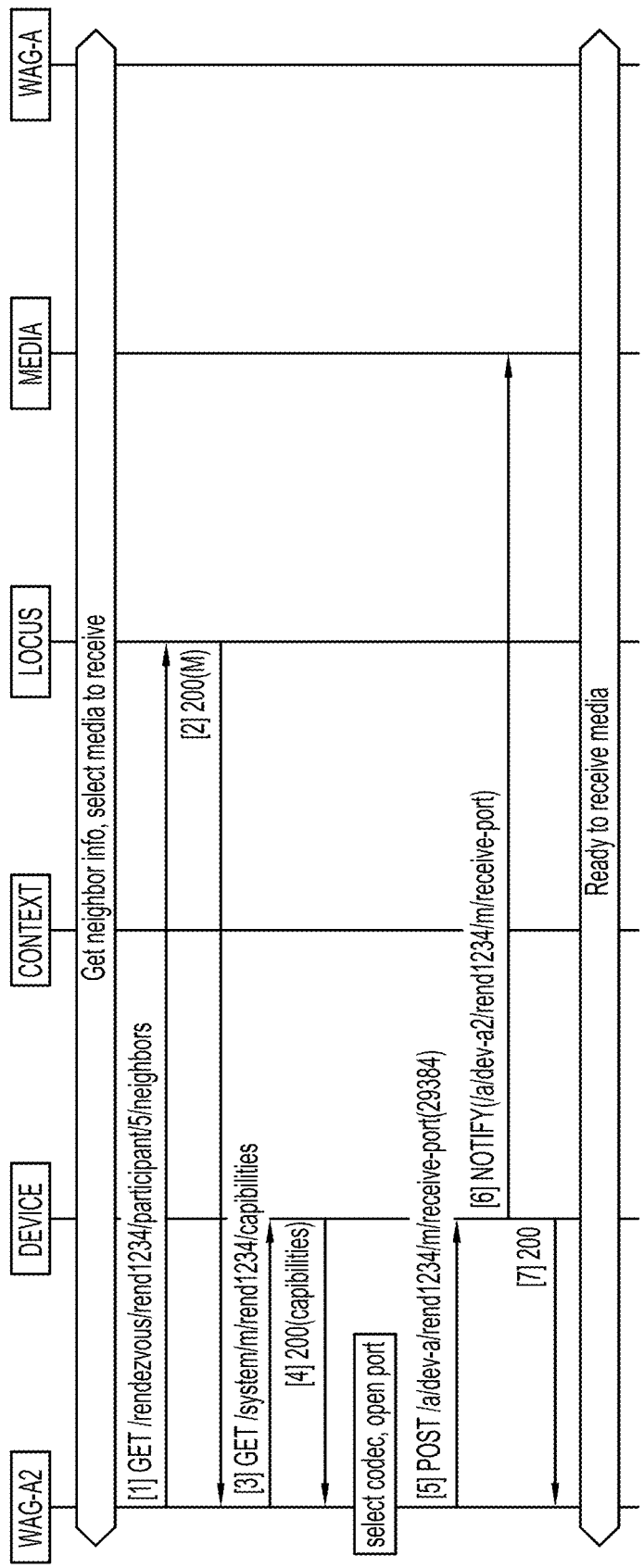
Figure 42:
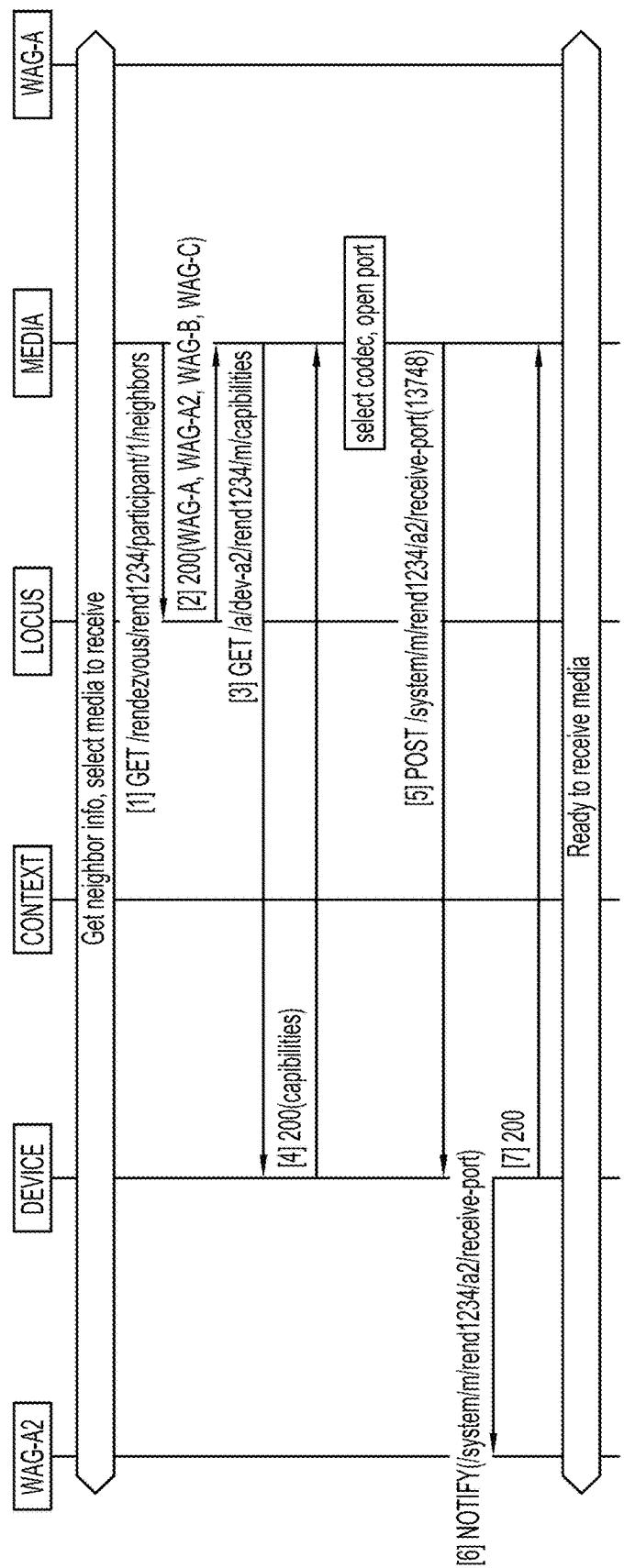

The next series of communications between WAG-A2 and components of system 4 are similar to those previously described for other WAG client devices in relation to establishing an appropriate connection for sending and/or receiving media streams with the media bridge associated with the rendezvous point defining the real-time communication. Referring to FIG. 41, WAG-A2 obtains information about the media bridge, including capability information, and then posts information about media streams WAG-A2 desires to receive (and which the media bridge is capable of sending) including open receive ports at the WAG-A2 client device 6, followed by a notification being provided to the media server 28 (messages [1]-[7]). In particular, WAG-A2 provides an indication to the media server 28 (via messages [5] and [6]) that it desires to receive video streams from the media bridge at a particular receive port (e.g., port Z) and via a particular codec (e.g., H.264). Referring to FIG. 42, the same process occurs with the media server 28 obtaining information about WAG-A2, including capability information, and then posts information about video streams the media bridge desires to receive from WAG-A2 (and which WAG-A2 is capable of sending) including open receive ports at the media bridge, followed by a notification being provided to the event stream of WAG-A2 (messages [1]-[7]).

When WAG-A2 has achieved a connection with the media bridge (thus establishing a two-way communication of video content for the real-time communication between the WAG-A2 client device 6 and the media bridge), termination of the video stream connection between the media bridge and WAG-A is initiated. Referring to FIG. 43, the media server initiates a shut-down of the video stream to the receive port of the WAG-A client device 6 (via message [1] sent to the device manager 32 and/or locus server 14), and WAG-A is provided with a notification (message [2]). At FIG. 44, WAG-A receives information regarding the shut-down of video streams to the receive port of the WAG-A client device 6 (messages [1] and [2]), and the shut-down is confirmed (messages [3]-[5]).

At FIG. 45, the two-way video stream between WAG-A2 and the media bridge is implemented. In particular, WAG-A2 obtains information about what types of video streams the media bridge can receive and at which port from the WAG-A2 client device 6 (messages [1] and [2]), and then the WAG-A2 client device 6 sends video streams to the media bridge (message [3]). Similarly, the media server 28 obtains information about what types of video streams the WAG-A2 client device 6 can receive and at which port from the media bridge (messages [4] and [5]), and then the media bridge sends video streams to the WAG-A2 client device 6 (message [6]). At FIG. 46, the two-way video stream between the WAG-A client device 6 and the media bridge is shut down or terminated (messages [1]-[4]). It is noted, however, that the WAG-A client device 6 continues to maintain a two-way audio stream with the media bridge, thus allowing Alice to send and receive video content in relation to the real-time communication via her WAG-A2 client device (e.g., laptop or tablet) while also sending and receiving audio content in relation to the same real-time communication via her WAG-A client device (e.g., mobile phone).

While the example embodiment described with reference to FIGS. 37-46 relates to splitting audio and video content to two different client devices of the same participant (i.e., two client devices associated with the same WAG account), the system 4 also enables users/participants to duplicate audio and/or video streams to two or more client devices for the same real-time communication. For example, in a scenario in which Alice desires to maintain both audio and video content for the real-time communication at her WAG-A client device 6 (e.g., mobile phone) but also duplicate video content for this same communication at her WAG-A 2 client device 6 (e.g., laptop or tablet), the same previously described process can be utilized with the exception that no termination of the video stream to the WAG-A client device is implemented.

In scenarios in which two or more client devices are duplicating audio and/or video streams for the same real-time communication, it may be desirable for the user/participant of the client devices to enable two way media streaming with the media bridge for only a single client device while enabling one way media streaming (e.g., receiving only) for other client devices. The system 4 can easily accommodate such features based upon the previously described example embodiments.

Further, in scenarios in which a user's WAG account may have two or more active conversations taking place, it is also possible for the user to engage in one conversation (e.g., a real-time communication such as a phone call or instant message communication) using a first client device registered with the user's WAG account while simultaneously engaging in another conversation using a second client device registered with the user's WAG account.

Thus, a variety of possible implementations of the locus-based cloud service system 4 can be achieved, since users can register multiple client devices with the same WAG account and easily obtain information about current conversations via event stream notifications to the registered client devices. The WAG apps provided on the client devices further allow the client devices to interact with the WAG server, which allows the client devices to obtain up-to-date information about the locus topology from the locus server and also allows easy access to connect with real-time communications that may be currently engaged in by multiple parties (via a media bridge).

The examples described herein to this point relate to client devices that operate as cloud endpoints in that these client devices are mobile devices that connect directly with the system 4 to engage in services hosted by the system 4. As previously noted, with reference to FIG. 1, other devices, such as on-prem devices associated with an enterprise system 100, can also receive services from the system 4. However, the on-prem devices are not mobile devices/cloud endpoints but instead are supported by the enterprise system 100, where the enterprise system 100 must connect with system 4 to enable the cloud services for the on-prem devices. As described herein, the system 2 of FIG. 1 can be configured to effectively integrate on-prem devices of the enterprise system 100 with the system 4 such that the on-prem devices are provided with the same functionalities as the cloud endpoint/mobile devices as previously described herein. In other words, the enterprise system 100 is enabled with features that allow a user having an on-prem device registered with the enterprise system 100 as well as one or more cloud endpoint/mobile devices 6 registered with system 4 to utilize any of these devices to engage in real-time communications hosted by the system 4 (as well as duplicate and/or split media streams between multiple mobile devices and on-prem devices).

Figure 47:
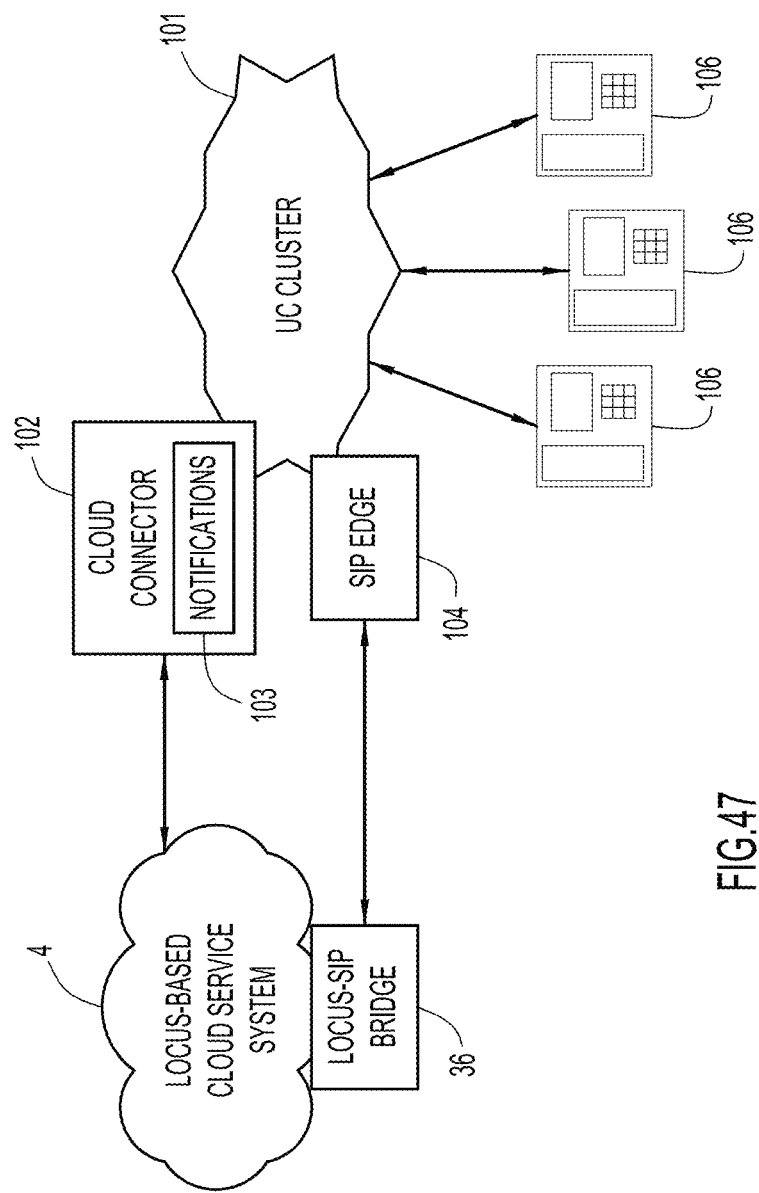
FIG. 47 is a schematic block diagram of another example embodiment of an environment in which a cloud based system hosts real-time communications between cloud based participants as well as enterprise based participants of an enterprise system, where the enterprise system includes a cloud connector system to facilitate control of on-prem devices in accordance with information provided by the cloud based system to the enterprise system

An example embodiment depicting an enterprise system 100 interacting with the system 4 to enable real-time communications between one or more on-prem devices of the system 100 and/or one or more client devices of the system 4 is depicted in FIGS. 47, 48 and 50-54. Referring to FIG. 47, the enterprise system 100 comprises a unified communications (UC) cluster 108 for a business or organization. The UC cluster 101 comprises conventional and/or any other suitable components, including one or more servers, routers and/or other types of suitable network interfaces, as well as any other suitable hardware and related software applications configured to provide UC services to on-prem devices as described herein. In particular, the one or more servers of the UC cluster 101 are configured to manage on-prem devices for users (e.g., employees or members of the business or organization) as to provide services for users of the on-prem devices including, without limitation, call control services via VoIP (Voice over Internet Protocol) and/or other protocols (including management of internal calls between on-prem devices within the system 100 as well as incoming calls from outside the system 100 to on-prem devices within the system 100), instant messaging and email services, presence services, and various types of collaboration tools (e.g., hosting web conferencing services, virtual communities, etc.). The call control services provided by the UC cluster 101 can utilize conventional CTI (call telephony integration) to provide standard services associated with calls (e.g., "off hook" features for dialing a call from an on-prem device, call hold features, call forwarding features, as well as various other features associated with call connections for the on-prem devices). As depicted in FIGS. 48 and 50-54, the UC cluster 101 can further include sub-clusters or networks of call agent clusters (e.g., depending upon the size of the enterprise and number of on-prem devices associated with the enterprise) that are networked to interact with each other. For example, sub-clusters can be divided by regional enterprise locations (e.g., one sub-cluster may manage one or more enterprise offices at a first region while another sub-cluster may manage one or more enterprise offices at a second region). In embodiments in which sub-clusters are utilized, a central cluster session manager can be provided to manage routing of calls to the appropriate sub-cluster.

The UC cluster 101 further includes a cloud connector device 102. The cloud connector device comprises a server including at least one processor and one or more suitable software applications including instructions executable by the at least one processor to enable the cloud connector device to communicate with one or more of the context server 18, the locus server 14, the device manager 32, the media server 28 and the WAG server 10 of the system 4 as described herein to receive notifications associated with real-time communications including communication requests that may be directed to users having on-prem devices 106 associated with the UC cluster 101. The cloud connector device 102 includes a notifications manager 103 that manages the notifications received from the system 4 so as to enable on-prem devices 106 to engage in real-time communications hosted by the system 4 as well as share and/or split media streams with other on-prem devices and/or client devices 6 of users as described herein. The UC cluster 101 further includes an SIP edge device 104 comprising a server with at least one processor and one or more suitable software applications including instructions executable by the at least one processor to enable the SIP edge device to communicate with the locus-to-SIP bridge server 36 of the system 4 to facilitate exchange of SIP communication sessions including media streams with the system 4. In certain embodiments, the cloud connector device 102 and SIP edge device 104 can be integrated together as one or more server devices to control operations associated with enabling on-prem devices of the enterprise system to engage in real-time communications hosted by the cloud service system 4.

Each on-prem device 106 comprises a computing device (e.g., desktop computers, desktop phones, laptops, etc.) with one or more processors and memory including one or more suitable software applications that include instructions executable by the one or more processors to facilitate operation of the on-prem device in relation to the services provided by the UC cluster 101, including engaging in real-time communications with other on-prem devices within the UC cluster 101 as well as client device 6 of the locus-based cloud service system 4.

Figure 48:
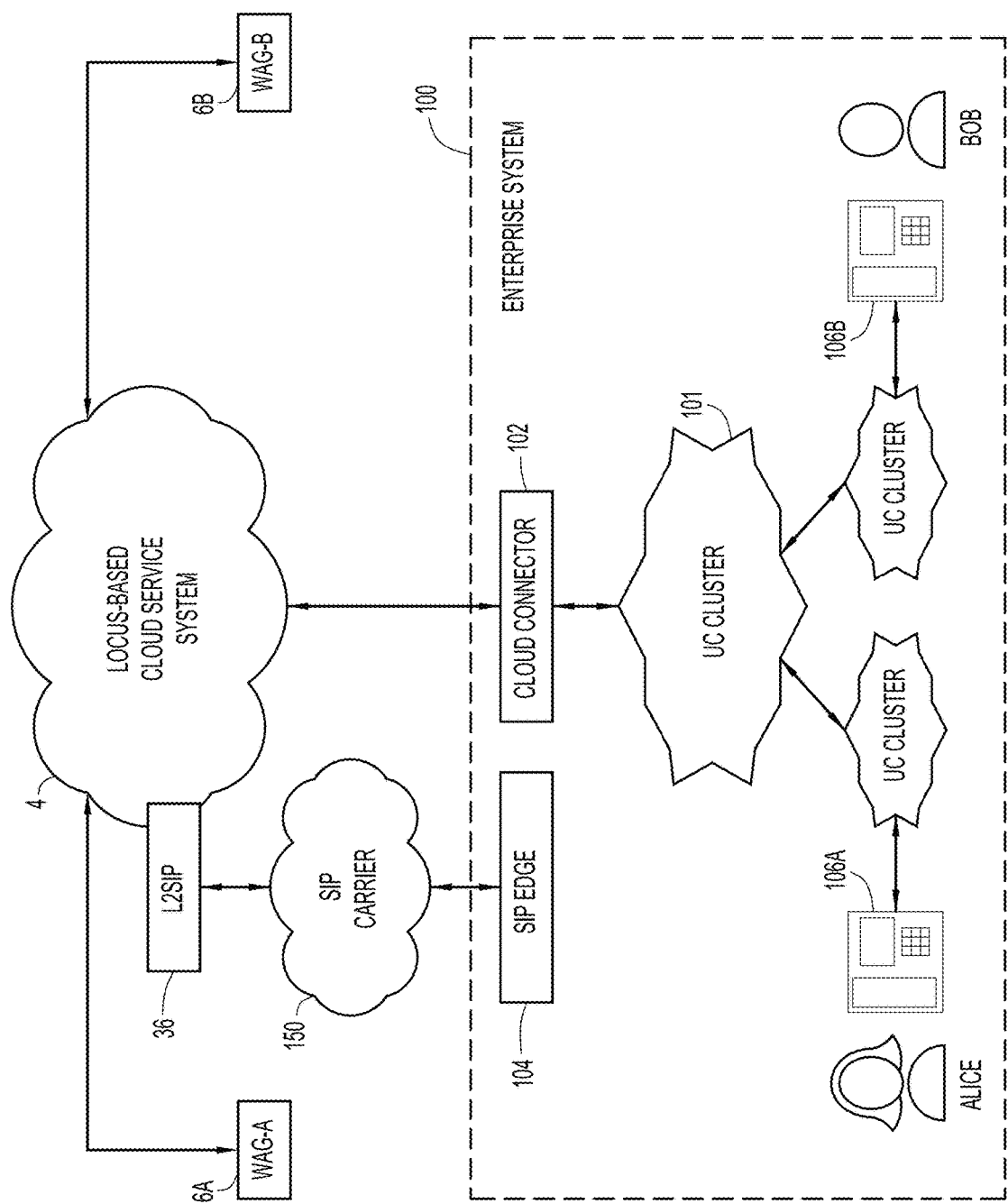
FIG. 48 is a schematic block diagram of an example embodiment of the enterprise system of FIG. 47.

An example embodiment is depicted in FIG. 48 of the overall system in which the enterprise system 100 is integrated with the cloud service system 4 (to facilitate hosting of real-time communications by the system 4, in which on-prem devices of system 100 can engage in such real-time communications). In this example embodiment (as well as the further embodiments depicted in FIGS. 50-54), users Alice and Bob are again two participants in a real-time communication in which Alice and Bob both have at least one client device 6A, 6B (e.g., a mobile phone) registered with system 4 (including WAG accounts, WAG-A for Alice and WAG-B for Bob) and also at least one on-prem device 106A, 106B (e.g., a VoIP phone also having video capabilities) registered with system 100.

Figure 49:
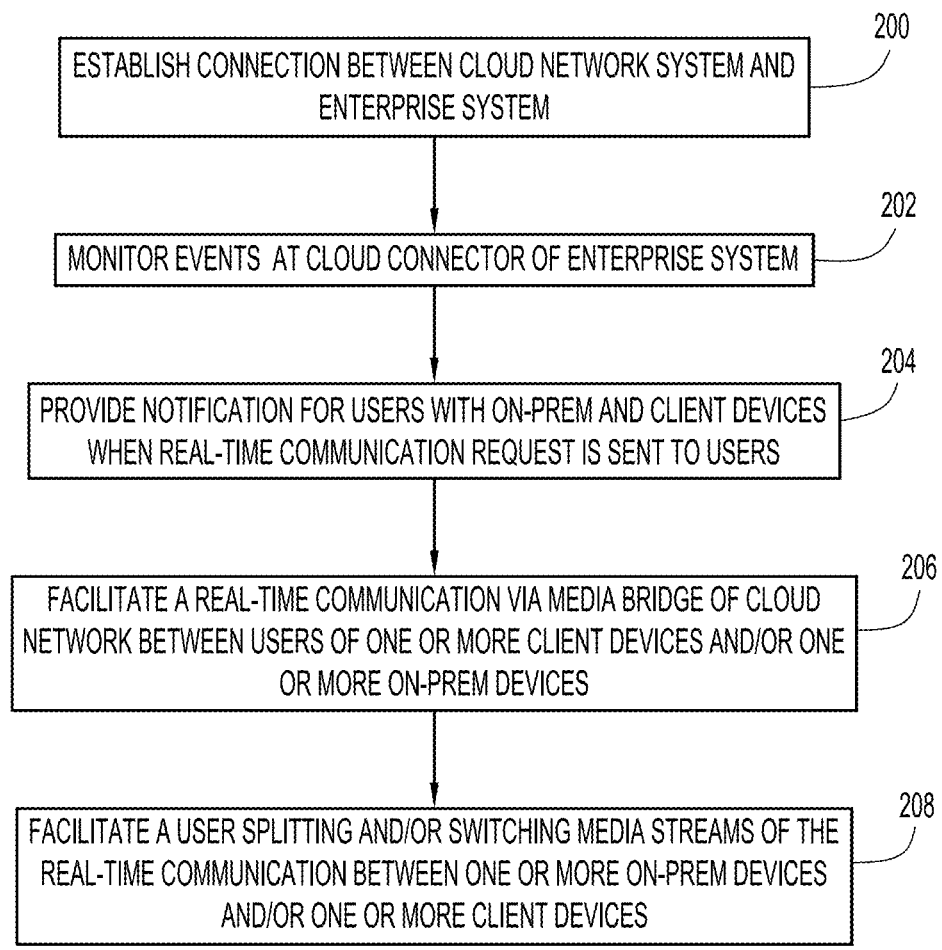
FIG. 49 is a flow chart depicting an example process for initiating and establishing a real-time communication utilizing the system of FIG. 47.

An example embodiment of a process for facilitating communications between the locus-based cloud service system 4 and the enterprise system 100 is depicted in the flowchart of FIG. 49. At 200, a connection is established between the cloud service system 4 and the enterprise system 100 for exchanging media streams in relation to a real-time communication. In particular, an SIP connection is established between the locus-to-SIP bridge server 36 and the SIP edge device 104, which can be facilitated via a suitable SIP service provider or carrier 150 as depicted in FIG. 48.

At 202, the cloud connector device 102 of the UC cluster 101 monitors events of the cloud service system 4 and, in particular, notifications associated with real-time communications as generated and maintained by the context server 18 (via the events module 22). As previously noted, the cloud connector device 102 can communicate with any of the components of the system 4, including the locus server (e.g., in order to query the locus associated with a real-time communication as necessary). As 204, notifications are provided to client devices 6 of the system 4 in the manner previously described (including notifications to client devices 6A and 6B associated with Alice and Bob). Such notifications include real-time communication requests as well as other information associated with real-time communications (e.g., based upon locus topology changes). The cloud connector device 102, which monitors real-time communication notifications of system 4, also stores and manages such notifications via its notifications module 103 and provides notifications to on-prem devices 106 that are associated with such real-time communication notifications. In particular, the on-prem devices 106 of the enterprise system 100 can also be registered (via the cloud connector device 102) to the WAG account of a user of the cloud service system 4, such that notifications associated with the user's WAG account can be monitored by the cloud connector device 102 and thus also provided to the same user's on-prem devices 106 that are registered with the enterprise system 100. The notifications relating to real-time communications that are generated and managed by the cloud service system 4 and are routed (via the cloud connector device 102) to on-prem devices 106 can be similar to the notifications provided to client device 6. Alternatively, the notifications to on-prem devices 106 can simply be a standard notification to the on-prem device that is provided by the enterprise system 100 (e.g., an on-prem phone rings when a phone call request is directed to the on-prem phone).

At 206, a real-time communication is facilitated via the media bridge of the cloud network between users of client devices 6 and/or on-prem devices 106. For on-prem devices 106 of the enterprise system 100, the locus-SIP bridge server 36 of the system 4 communicates with the SIP edge device 104 (via a suitable SIP carrier 150) to facilitate exchange of media streams between on-prem devices 106 and client device 6 via the media bridge hosted by the media server 28 of system 4. At 208, a user can split and/or switch one or more media streams of the real-time communication between one or more on-prem devices 106 and/or one or more client devices 6 in a manner similar to that previously described herein. The changing of media streams (splitting and/or switching) can be accomplished by the user via the user's client device 6 in a manner as previously described. Alternatively, on-prem devices 106 can also be provided with suitable capabilities to facilitate user interaction within system 4 (via the cloud connector device 102 of the UC cluster 101) in a manner similar to that previously described for a client device 6 in order to achieve such a change.

In this system which integrates the cloud service system 4 with the enterprise system 100, there are different scenarios in which a real-time communication can occur between one or more client devices 6 and/or one or more on-prem devices 106. In particular, the following four call connection scenarios are possible: 1. Call from client device 6 to client device 6 (cloud-to-cloud); 2. Call from client device 6 to on-prem device 106 (cloud-to-enterprise); 3. Call from on-prem device 106 to client device 6 (enterprise-to-cloud); and 4. Call from on-prem device 106 to on-prem device 6 (enterprise-to-enterprise).

Figure 50:
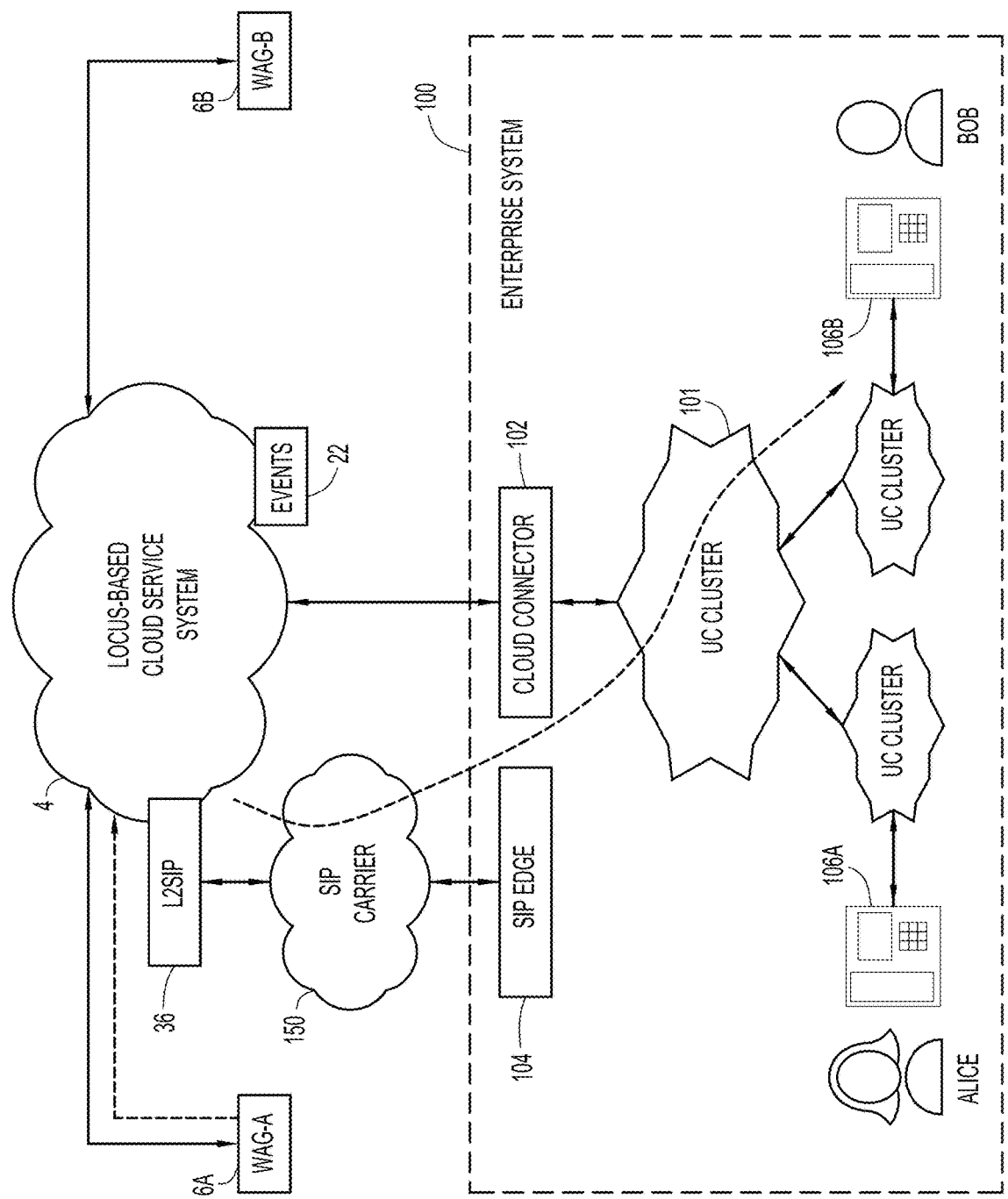
FIG. 50 depicts the environment of FIG. 47 and further showing the communication flow in which a first participant using a cloud based client device initiates a communication to a second participant at an on-prem device registered with the enterprise system.

Referring to FIG. 50, a scenario is described in which Alice initiates a real-time communication via the cloud service system 4 by calling Bob via her client device 6A. In a manner as previously described, an event notification of the real-time communication request is generated for a conversation in the events module 22 of the context server 18, and a locus is generated by the locus server 14 that defines the real-time communication. Notifications are sent by the WAG server 10 (e.g., via the push notification service 12) to client devices 6A and 6B registered with the WAG accounts WAG-A and WAG-B of Alice and Bob that provide an indication of the requested phone call. In addition, the cloud connector device 102, which is monitoring the event streams of Alice and Bob (both of which are also registered uses of the enterprise system 100) that are hosted by system 4, provides notifications to their on-prem devices 106A and 106B of the requested phone call. For example, this may result in Bob's on-prem device 106B ringing (where the notification is in the form of a standard call notification for the on-prem device). In another embodiment, Bob's on-prem device 106B may be provided with another notification that provides Bob with an option to join the real-time communication in a manner similar to that previously described for cloud-cloud connections between client devices 6 (e.g., where Bob is provided with the option of joining the locus, where the call is established in response to Bob accepting).

Thus, the call initiated by Alice via her client device 6A to Bob over the cloud service system 4 results in notifications being made to the client devices 6A and 6B of Alice and Bob (via system 4) and also the on-prem devices 106A and 106B of Alice and Bob (via the cloud connector device 102 of the enterprise system 100) such that Alice and Bob can choose to engage in the real-time communication via one or both of their client devices and on-prem devices.

In the scenario depicted in FIG. 50, the cloud service system 4 (which is made aware of Bob's on-prem device 106B by the cloud connector device 102) establishes an out-going call from the locus-to-SIP server 36 to the SIP edge 104 (and via the SIP carrier 150) that is routed via the UC cluster 101 to Bob's on-prem device 106B, and this results in Bob's on-prem device 106B ringing to provide a notification of an incoming call. In this scenario, Bob chooses to answer the call via his on-prem device 106B, and the call is established between Alice's client device 6A and Bob's on-prem device 106B which is hosted by the media bridge of the cloud service system 4 (as indicated by the dashed arrows in FIG. 50).

Figure 51:
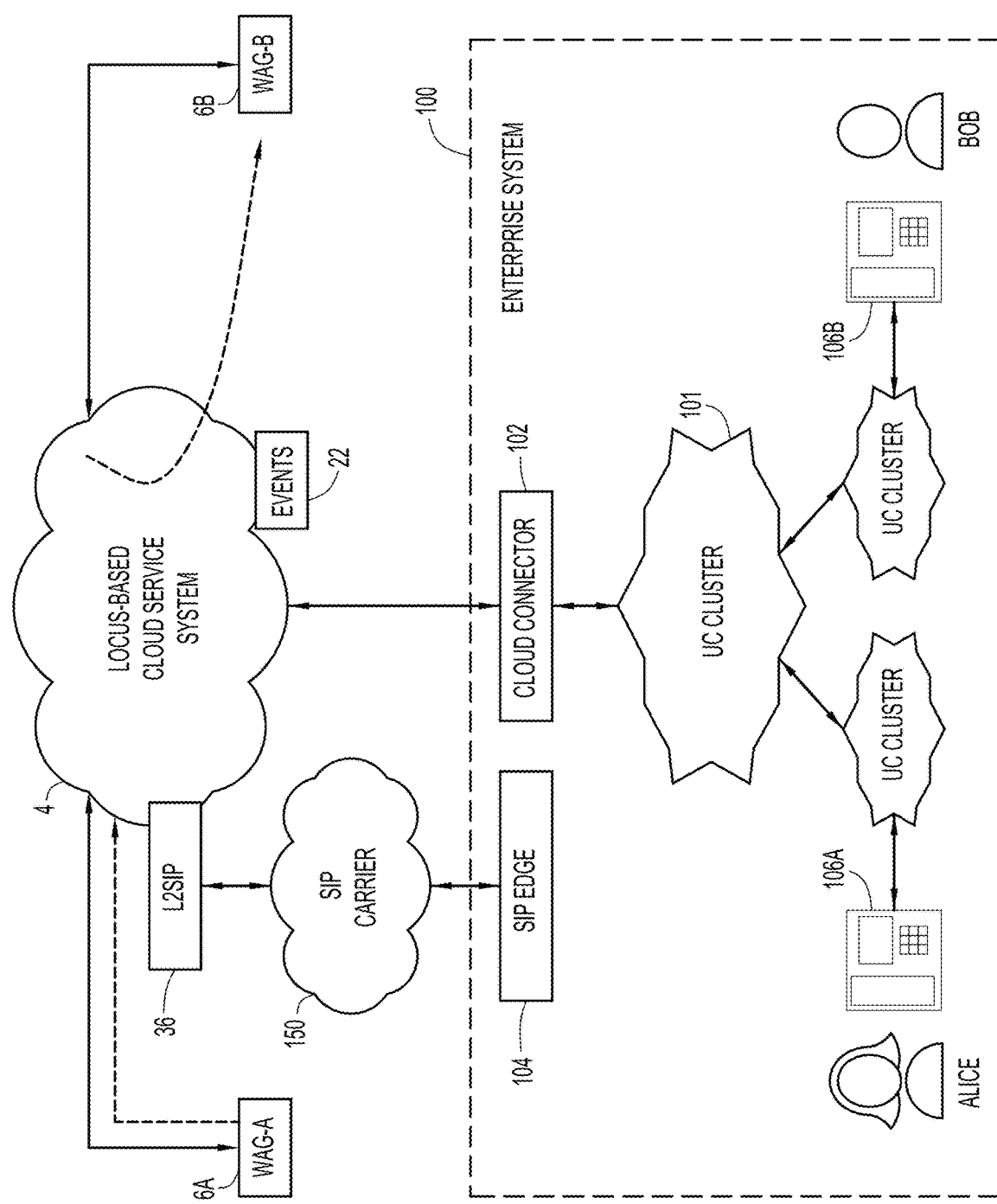
FIG. 51 depicts the environment of FIG. 50 and further showing the communication flow in which the second participant selects to receive the communication from the first participant at a cloud based client device of the second participant.

Referring to FIG. 51, rather than answering with his on-prem device 106B, Bob selects to engage in the phone call via his client device 106B (as indicated by the dashed arrows in FIG. 51). This connection is achieved in a manner similar to that which has been previously described herein (i.e., Bob's action results in a direct cloud-to-cloud connection between client devices 6A and 6B) which also results in the call being hosted by the media bridge of the cloud service system 4.

In either of the scenarios of FIGS. 50 and 51, the cloud connector device 102 of the enterprise system 100 also maintains its awareness of the present connection between devices associated with the real-time communication (based upon event notifications by the context server 18 and/or based upon topology changes in the locus maintained by the locus server 14 of system 4). In a scenario in which Alice and/or Bob is currently engaged in the real-time communication via their client device 6, their on-prem devices 106 are still enabled with the ability to also connect into this real-time communication. For example, an on-prem device 106 can be provided with a suitable interface (e.g., number/button pad, touch screen, etc.) that provides the user with the option of engaging in the current or ongoing real-time communication via their on-prem device even after a call connection has been made with another client device or on-prem device associated with the user. Thus, even though Alice initiated the real-time communication via her client device 6, Alice's on-prem device 106A is also provided with the ability to join in the real-time communication (e.g., by sharing and/or splitting media streams between Alice's client device 6A and her on-prem device 106A as described herein).

The cloud connector device 102 can further control notifications sent to multiple client devices and/or on-prem devices of users based upon prioritization policies implemented by the enterprise system 100. In the previous example in which Alice initiates a call with Bob, Bob's on-prem device 106B may be ringing simultaneously with his client device 6B providing a notification of the call request from Alice. In the event Bob selects to answer the call with his client device 6B, the cloud connector device 102 (being made aware of Bob's client device 6B engaging in the call through its monitoring of the event streams of Bob which are provided by system 4) can withdraw the connection request with Bob's on-prem device 106B (such that the on-prem device stops ringing). Alternatively, options can be provided (e.g., via interactive display menus) at Bob's on-prem device 106B and/or at his client device 6B that allow Bob to select whether to engage in only one media stream when electing to answer the call from such device (or to share media streams with other devices). For example, Bob may choose to send/receive video content from the real-time communication at his client device 6B (e.g., a tablet) while choosing to send/receive audio content from the real-time communication at his on-prem device 106B (e.g., desktop VoIP phone).

Figure 52:
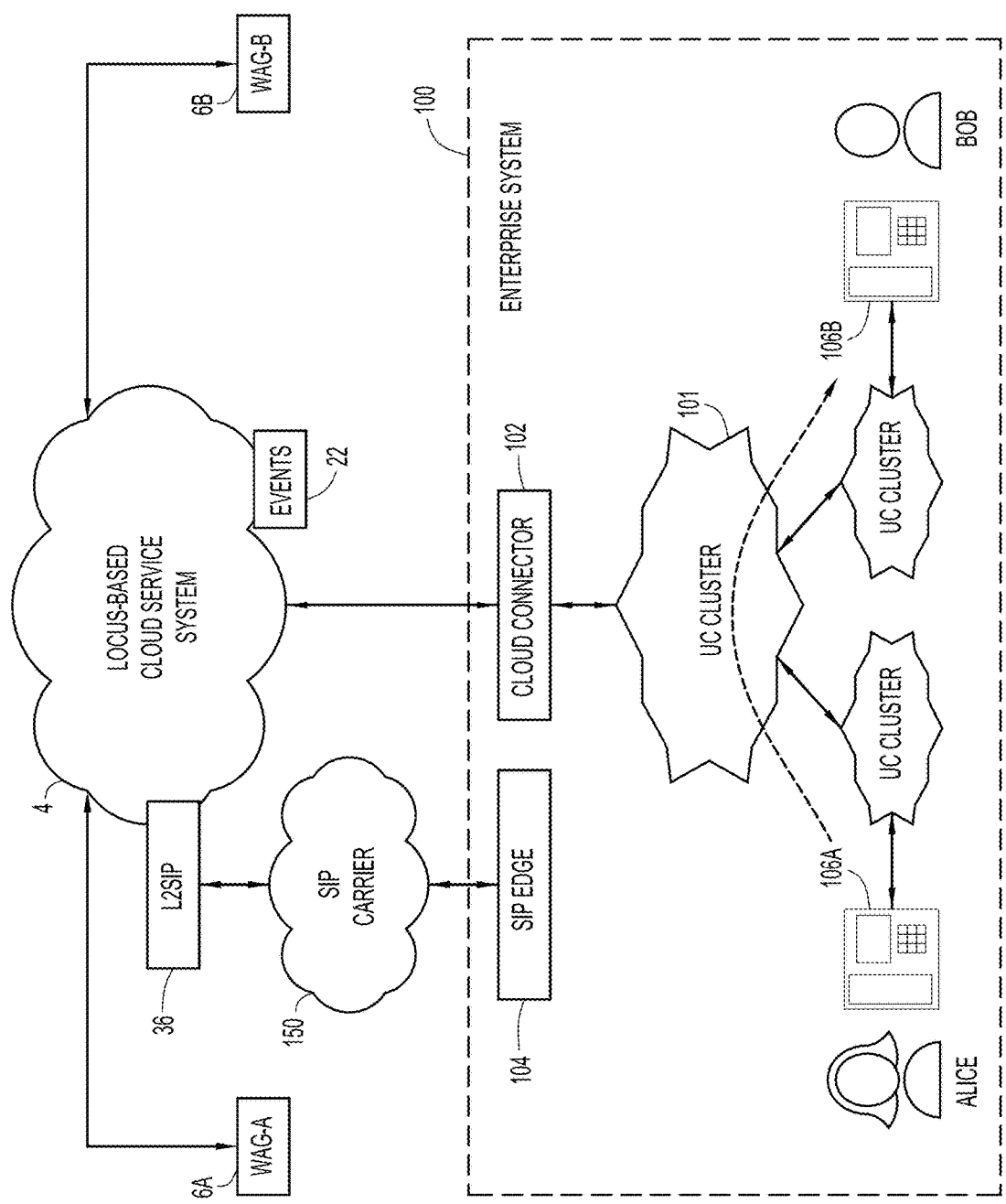
FIG. 52 depicts the environment of FIG. 47 and further showing the communication flow in which the first participant using an on-prem device registered with the enterprise system initiates a communication to a second participant at an on-prem device registered with the enterprise system.

Referring to FIG. 52, a scenario is now described in which Alice initiates a call to Bob via her on-prem device 106A. For example, Alice may call Bob at the number associated with Bob's on-prem device 106B (e.g., an extension number assigned to Bob). This results in Bob's on-prem device 106B providing a notification of the call request (e.g., the on-prem device starts to ring). The cloud connector device 102, which monitors real-time communications for users of the enterprise system 100 as well as the cloud services system 4, provides a notification to system 4 regarding this real-time communication request from Alice to Bob. In particular, the cloud connector device 102 posts an event notification into the events module 22 of the context server 18 (and also optionally notifies the locus server 14) of the real-time communication request from Alice to Bob. This notification is provided to the event streams of the client devices 6A and 6B of Alice and Bob. Thus, at this point, Bob has the option of answering the call from Alice at his client device 6B or his on-prem device 106B.

In the scenario of FIG. 52, Bob answers the call with his on-prem device 106B. This results in a call connection between the on-prem device 106A of Alice and the on-prem device 106B of Bob which is hosted and managed by the UC cluster 101 of the enterprise system 100 (as indicated by the dashed arrow). In other words, management of the call is exclusively handled and maintained by the enterprise system 100 without the need for the media bridge of the cloud services system 4). However, the cloud connector device 102 still monitors the call in the event Bob or Alice chooses to re-route the call on their end to another device (e.g., a client device 6A or 6B of Bob or Alice).

Figure 53:
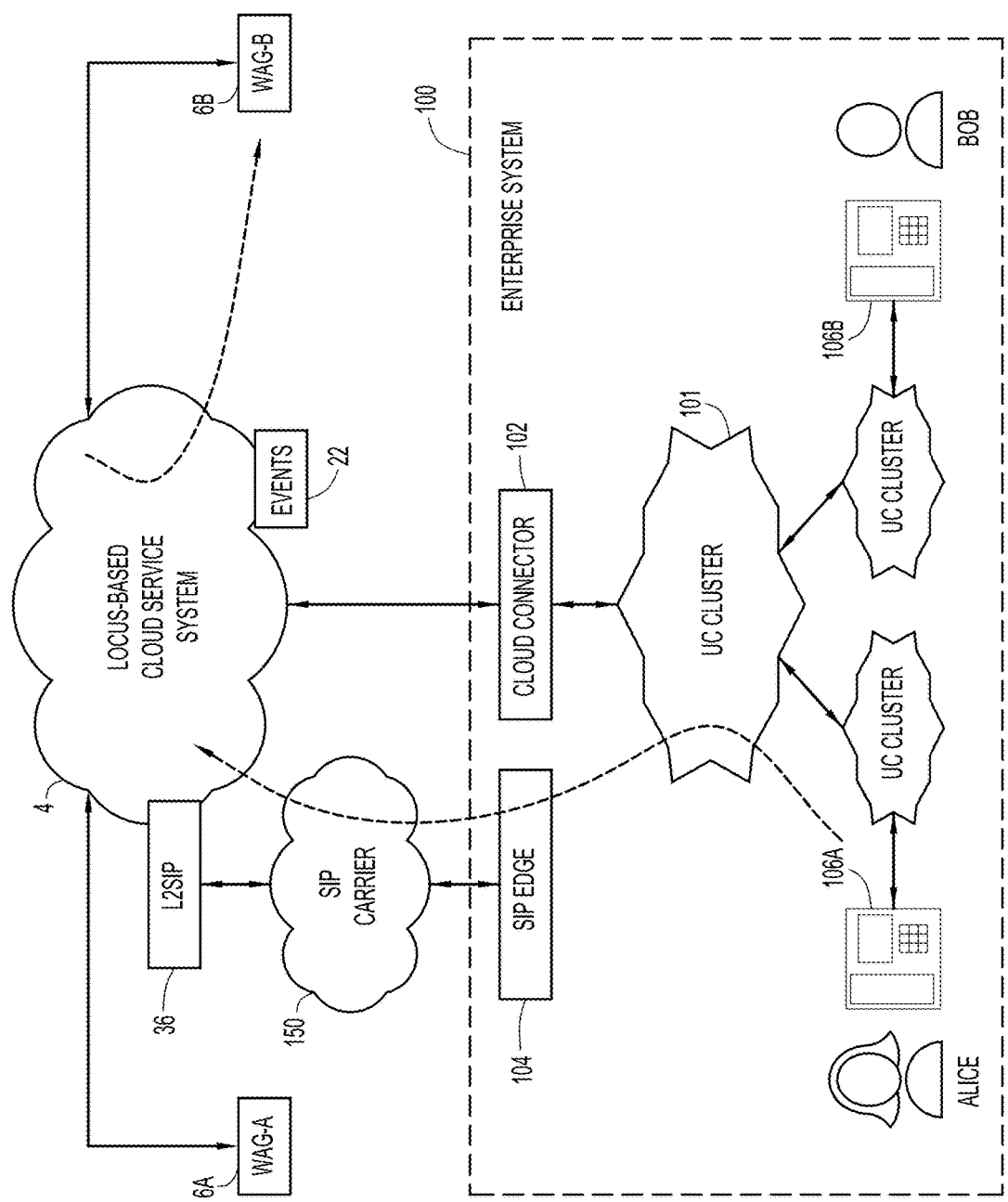
FIG. 53 depicts the environment of FIG. 47 and further showing the communication flow in which the first participant using an on-prem device registered with the enterprise system initiates a communication to a second participant at an on-prem device registered with the enterprise system, and the second participant selects to receive the communication from the first participant at a cloud based client device of the second participant.

In an alternative scenario of FIG. 53, Bob chooses to answer the call from Alice (who is calling from her on-prem device 106A with the call being made to Bob's on-prem device 106B) with his client device 6B instead of his on-prem device 106B. By choosing to answer the call at his client device 6B, a corresponding event notification is provided via Bob's WAG-B account to the WAG server 10, which results in the context server 18 storing the event in the events module 22 and event notifications being sent. The cloud connector device 102, which is monitoring events stored by the events module 22, is made aware of this event notification and implements appropriate call control procedures to achieve the appropriate connection. This results in an immediate re-directing or re-forging of the call from being handled exclusively by the enterprise system to the call being hosted by the cloud services system 4 (where a media bridge managed by the media server 28 is utilized to connect Alice with Bob). In particular, the call is re-directed from Alice's on-prem device 106A to Bob's client device 6B via the connection between the SIP edge device 106 and the locus-to-SIP bridge server 36 over the SIP carrier 150 (as shown by the dashed arrows in FIG. 53). Thus, the immediate re-forging of the call results in a connection between Alice's on-prem device 106A and Bob's client device 6B that is hosted by a media bridge of the cloud services system 4. As with the other scenarios, the systems 4 and 100 are also configured such that each of the client device 6A of Alice and the on-prem device 106B of Bob are enabled to join the call by user choice at any time during the current or ongoing real-time communication.

Figure 54:
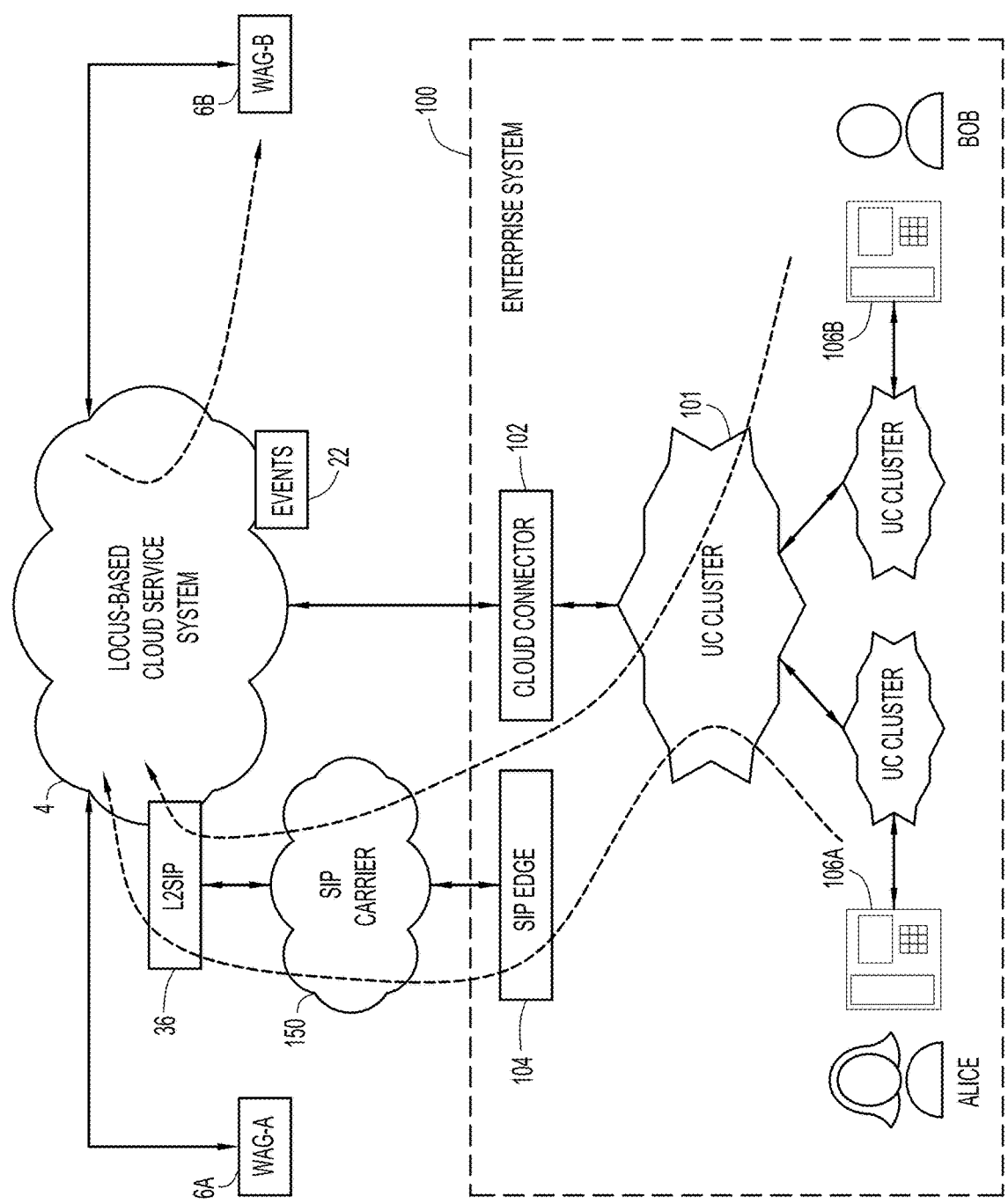
FIG. 54 depicts the environment of FIG. 52 and further showing the communication flow in which the second participant initially selects to receive the communication from the first participant at the on-prem device of the second participant and registered with the enterprise system followed by the second participant electing to receive the communication at the cloud based client device of the second participant.

In the embodiment of FIG. 54, after the call has been established between Alice and Bob via their on-prem devices 106A and 106B (as depicted in FIG. 52), Bob decides he would like to switch at least one of the audio and video streams to a client device 6B registered with the cloud services system 4. This results in a deferred re-directing or re-forging of the call. In other words, the call, which was initially exclusively hosted and maintained within the enterprise system, is now re-directed into the cloud service system 4. In particular, when Bob desires to add client device 6B to the call (e.g., to send and/or receive some portion of the call, such as video content), an event notification is provided to the context server 18, the event notification is stored at the events module 22, and the cloud connector device 102 is made aware of this event. The cloud connector can initiate the deferred re-direction or re-forge in any suitable manner.

In a first example embodiment, the cloud connector device 102 can initiate a deferred re-forge by initiating a call (via the SIP edge device 106/locus-to-SIP bridge server 36/SIP carrier 150 connection) from both on-prem devices 106A and 106B of Alice and Bob to a designated rendezvous point hosted by the media bridge and managed by the media server 28 (where such rendezvous point has been established as previously described herein). The media bridge is then configured by system 4 such that both the on-prem device 106B and the client device 6B of Bob can connect with the on-prem device 106A of Alice over the media bridge. This results in a seamless connection that adds a second device of Bob (his client device 106) to the real-time communication which pushes the hosting of the real-time communication between on-prem devices 106A and 106B and client device 6B into the cloud services system 4 (indicated by dashed arrows in FIG. 54).

In a second example embodiment, the cloud connector device 102 can initiate a deferred re-forge that is not as seamless as the first example but nevertheless still achieves the re-forge. In this embodiment, the cloud connector device 102 (having been made aware of the event notification that Bob desires to connect his client device 6B to the call) effects a re-direct of the call from Alice's on-prem device 106A to a designated rendezvous point hosted by a media bridge of system 4 (where such rendezvous point has been established as previously described herein), where the re-directing of media streams from Alice's on-prem device 106A is via the SIP edge device 106/locus-to-SIP bridge server 36/SIP carrier 150 connection. This re-direction of the call from Alice's on-prem device 106A results in a termination of the call to Bob's on-prem device 106B. However, the cloud connector device 102, at this point, can then also initiate a call to the rendezvous point (also via the SIP edge device 106/locus-to-SIP bridge server 36/SIP carrier 150 connection). Thus, Bob's on-prem device 106B is automatically disconnected (via a forced hang-up controlled by the cloud connector device 102) from the call with Alice's on-prem device 106A via the UC cluster 101 but then is automatically forced (by the cloud connector device 102 forcing a dial out of the on-prem device 106B) to connect with the rendezvous point so as to re-connect with the call.

In a further example embodiment of a deferred re-forge, the scenario is similar to the second example embodiment of a deferred re-forge with the exception that, after termination of the call to Bob's on-prem device 106B, the endpoint number to Bob's on-prem device 106B is dialed via the locus-based cloud service system 4 (i.e., a call is made to Bob's on-prem device 106B via the media bridge) to re-connect Bob's on-prem device 106B to the call. In other words, example deferred re-forge embodiments can be implemented in which endpoints dial in to the media bridge and/or the media bridge calls endpoints to re-establish connections to the call.

Thus, the cloud connector device of the enterprise system allows integration of the enterprise system with the locus-based cloud service system so as to enable the cloud service system to host real-time communications between on-prem (enterprise-based) devices and client (cloud-based) devices and to easily allow users to switch and/or split media streams between such devices during such real-time communications.

The above description is intended by way of example only.

What is claimed is:

1. A method comprising:
facilitating a connection between a cloud networking platform and a unified communication system, wherein the cloud networking platform hosts communication services including real-time communications for client devices, and the unified communication system hosts communication services including real-time communications for on-prem devices that are associated with the unified communication system;
monitoring events associated with the cloud networking platform at the unified communication system, via a cloud connector device of the unified communication system, wherein events are associated with users who are registered with client devices and on-prem devices, and the events include real-time communications;
providing a notification to one or more client devices registered to a first user in response to an on-prem device also registered to the first user receiving a real-time communication request from a device of another user;
facilitating a real-time communication session between a plurality of users that is hosted via a bridging service over the cloud networking platform, wherein each user engages in the real-time communication session via at least one of a client device and an on-prem device, and at least one user is the first user;
in response to the first user making a first selection to engage in the real-time communication session on a first client device or a first on-prem device, establishing a connection to the real-time communication session with the first client device or the first on-prem device; and
in response to the first user making a second selection after the first selection to make a switch from one or the other of the first client device and the first on-prem device during the real-time communication session, facilitating a switch of the connection to the real-time communication session by the first user from the first client device to the first on-prem device or from the first on-prem device to the first client device;

wherein connections to the real-time communication session facilitate the following:
both the first client device and the first on-prem device engage at the same time in the real-time communication session such that each of the first client device and the first on-prem device sends and receives audio content and/or sends and receives video content for the real-time communication session; or
one device selected from the group consisting of the first client device and the first on-prem device sends and receives audio content for the real-time communication session while the other device selected from the group consisting of the first client device and the first on-prem device sends and receives video content for the real-time communication session.

2. The method of claim 1, wherein the cloud networking platform generates and maintains a graph that identifies users and respective client devices engaged in the real-time communication session, wherein each user in the real-time communication session is represented as a node in the graph, and monitoring events via the cloud connector device further comprises:
receiving information from the cloud networking platform in relation to the graph, including updates to the graph based upon changes in client devices engaged with the real-time communication session.

3. An apparatus comprising:
a network interface unit configured to enable communications over a network; and
a processor configured to:
facilitate a connection, via the network interface, between a cloud networking platform and a unified communication system, wherein the cloud networking platform hosts communication services including real-time communications for client devices, and the unified communication system hosts communication services including real-time communications for on-prem devices that are associated with the unified communication system;
monitor events associated with the cloud networking platform at the unified communication system, wherein events are associated with users who are registered with client devices and on-prem devices, and the events include real-time communications;
provide a notification that is received by one or more client devices registered to a first user in response to an on-prem device also registered to the first user receiving a real-time communication request from a device of another user;
facilitate a real-time communication session between a plurality of users that is hosted via a bridging service over the cloud networking platform, wherein each user engages in the real-time communication session via at least one of a client device and an on-prem device, and at least one user is the first user;
in response to the first user making a first selection to engage in the real-time communication session on a first client device or a first on-prem device, establish a connection to the real-time communication session with the first client device or the first on-prem device; and
in response to the first user making a second selection after the first selection to make a switch from one or the other of the first client device and the first on-prem device during the real-time communication session, facilitate a switch of the connection to the real-time communication session by the first user from the first client device to the first on-prem device or from the first on-prem device to the first client device;
wherein the processor facilitates the following during connections to the real-time communication session:
both the first client device and the first on-prem device engage at the same time in the real-time communication session such that each of the first client device and the first on-prem device sends and receives audio content and/or sends and receives video content for the real-time communication session; or
one device selected from the group consisting of the first client device and the first on-prem device sends and receives audio content for the real-time communication session while the other device selected from the group consisting of the first client device and the first on-prem device sends and receives video content for the real-time communication session.

4. The apparatus of claim 3, wherein the cloud networking platform generates and maintains a graph that identifies users and respective client devices engaged in the real-time communication session, wherein each user in the real-time communication session is represented as a node in the graph, and the processor is further configured to monitor events by:
receiving information from the cloud networking platform in relation to the graph, including updates to the graph based upon changes in client devices engaged with the real-time communication session.

5. One or more computer readable storage media devices encoded with software comprising computer executable instructions and when the software is executed operable to:
facilitate a connection between a cloud networking platform and a unified communication system, wherein the cloud networking platform hosts communication services including real-time communications for client devices, and the unified communication system hosts communication services including real-time communications for on-prem devices that are associated with the unified communication system;
monitor events associated with the cloud networking platform at the unified communication system, wherein events are associated with users who are registered with client devices and on-prem devices, and the events include real-time communications;
provide a notification to one or more client devices registered to a first user in response to an on-prem device also registered to the first user receiving a real-time communication request from a device of another user;
facilitate a real-time communication session between a plurality of users that is hosted via a bridging service over the cloud networking platform, wherein each user engages in the real-time communication session via at least one of a client device and an on-prem device, and at least one user is the first user;
in response to the first user making a first selection to engage in the real-time communication session on a first client device or a first on-prem device, establish a connection to the real-time communication session with the first client device or the first on-prem device; and
in response to the first user making a second selection after the first selection to make a switch from one or the other of the first client device and the first on-prem device during the real-time communication session, facilitate a switch of the connection to the real-time communication session by the first user from the first client device to the first on-prem device or from the first on-prem device to the first client device;

wherein connections to the real-time communication session facilitate the following:

both the first client device and the first on-prem device engage at the same time in the real-time communication session such that each of the first client device and the first on-prem device sends and receives audio content and/or sends and receives video content for the real-time communication session; or one device selected from the group consisting of the first client device and the first on-prem device sends and receives audio content for the real-time communication session while the other device selected from the group consisting of the first client device and the first on-prem device sends and receives video content for the real-time communication session.

6. The one or more computer readable storage media devices of claim 5, wherein the instructions are further operable to generate and maintain a graph that identifies users and respective client devices engaged in the real-time communication session, wherein each user in the real-time communication session is represented as a node in the graph, and the instructions are further operable to monitor events by:

receiving information from the cloud networking platform in relation to the graph, including updates to the graph based upon changes in client devices engaged with the real-time communication session.

* * * * *